(12) United States Patent
Yamamoto

(10) Patent No.: US 8,453,516 B2
(45) Date of Patent: *Jun. 4, 2013

(54) ELECTROMAGNETIC FLOWMETER WITH AUTOMATIC SPAN CORRECTION

(75) Inventor: Tomoshige Yamamoto, Tokyo (JP)

(73) Assignee: Azbil Corporation, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 12/873,503

(22) Filed: Sep. 1, 2010

(65) Prior Publication Data

US 2011/0056305 A1 Mar. 10, 2011

(30) Foreign Application Priority Data

Sep. 4, 2009 (JP) ................................. 2009-204503

(51) Int. Cl.
*G01F 1/58* (2006.01)
(52) U.S. Cl.
USPC ....................................................... 73/861.12
(58) Field of Classification Search
None
See application file for complete search history.

(56) References Cited

U.S. PATENT DOCUMENTS

| 7,434,478 | B2* | 10/2008 | Yamamoto | 73/861.12 |
| 8,037,774 | B2* | 10/2011 | Yamamoto | 73/861.12 |
| 2007/0220993 | A1* | 9/2007 | Yamamoto | 73/861.16 |
| 2007/0234820 | A1* | 10/2007 | Yamamoto | 73/861.12 |
| 2008/0028867 | A1* | 2/2008 | Yamamoto | 73/861.12 |
| 2011/0056306 | A1* | 3/2011 | Yamamoto | 73/861.12 |

FOREIGN PATENT DOCUMENTS

| JP | 2005300325 A | 10/2005 |
| JP | 3774218 B2 | 5/2006 |

* cited by examiner

*Primary Examiner* — Harshad R Patel

(57) ABSTRACT

An electromagnetic flowmeter comprises a measuring pipe through which fluid to be measured flows, an electrode provided therein, an exciting unit, a signal line, a signal conversion unit that extracts a ∂A/∂t component that results from a change in the magnetic field from a resultant electromotive force of an electromotive force of the ∂A/∂t component; and an electromotive force of a v×B component that results from a flow speed of the fluid, wherein the resultant electromotive force is detected by the electrode and the signal line; and a flow rate output unit that eliminates, based on the extracted ∂A/∂t component, a variation factor as to a span that is a coefficient applied to a magnitude V of a flow speed of the v×B component in the resultant electromotive force so as to calculate a flow rate of the fluid.

14 Claims, 18 Drawing Sheets

F I G. 1 7
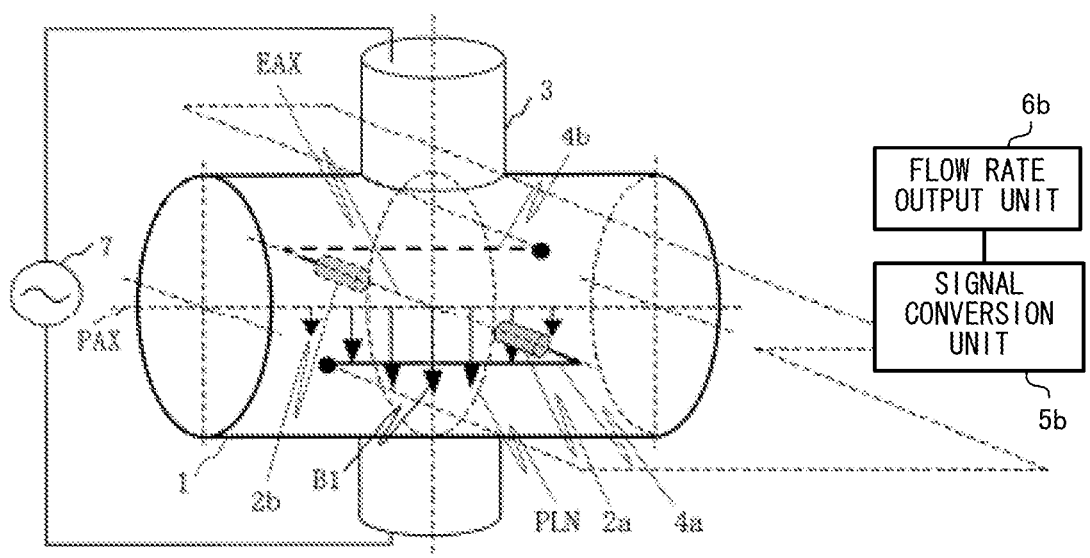

F I G. 2 4
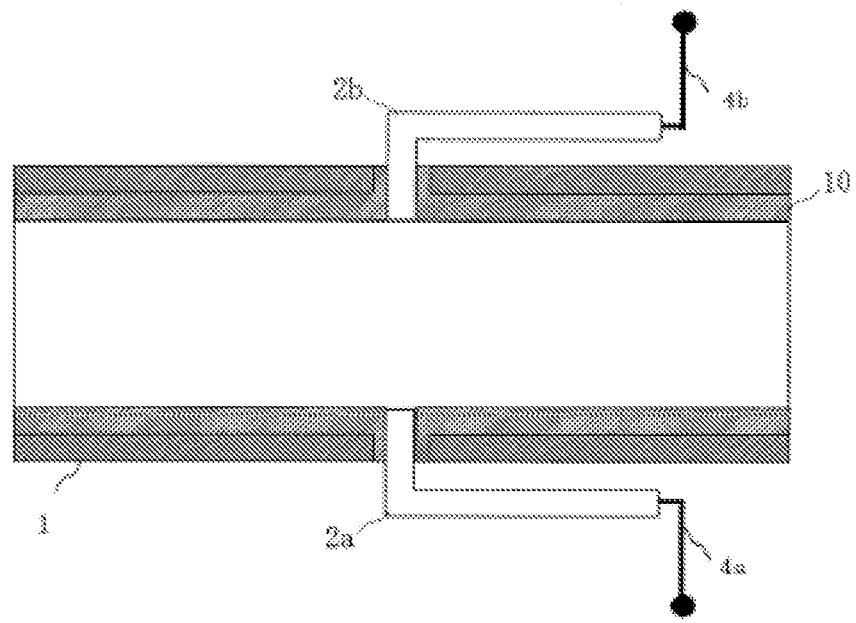
F I G. 2 5
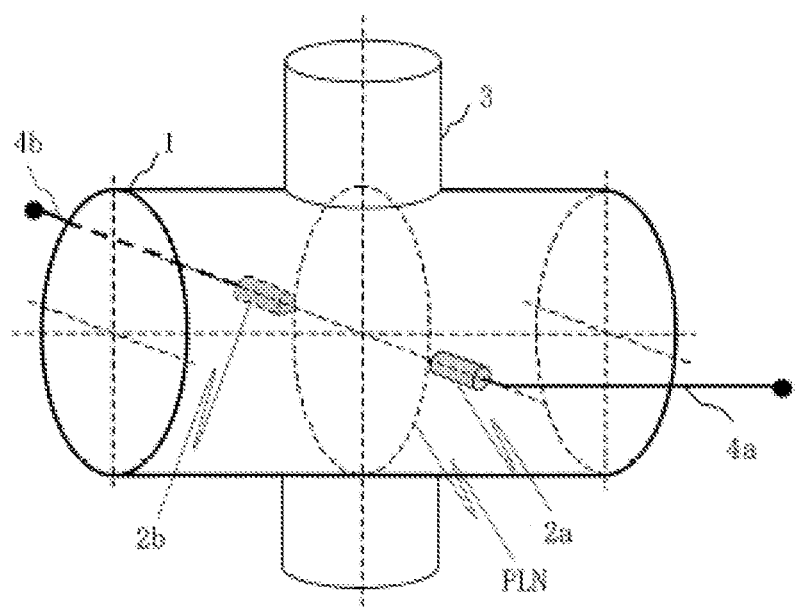

FIG. 26
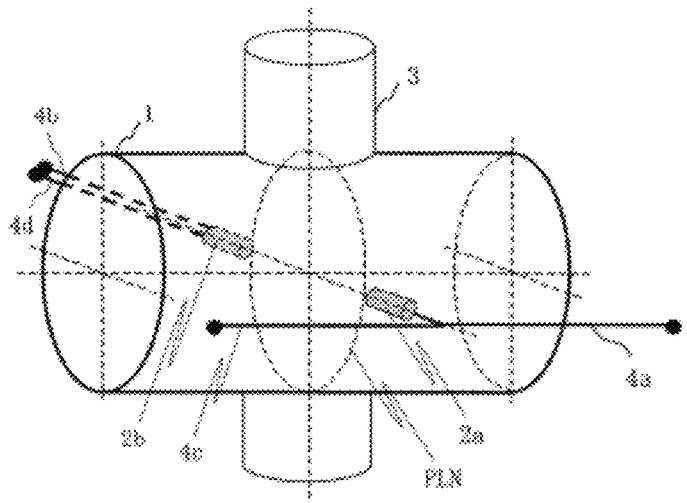
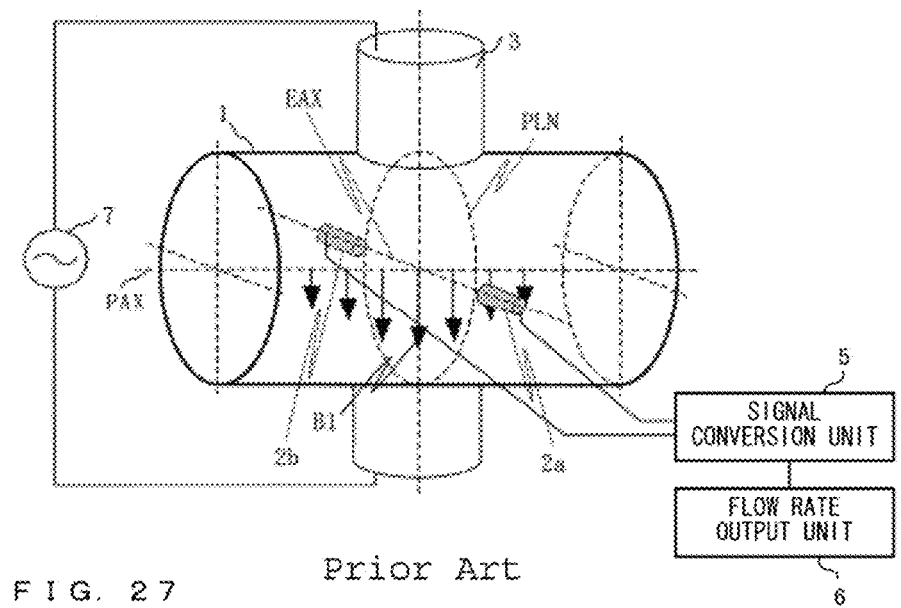
FIG. 27   Prior Art

Prior Art

ELECTROMAGNETIC FLOWMETER WITH AUTOMATIC SPAN CORRECTION

CROSS-REFERENCES TO RELATED APPLICATION

This application claims priority from Japanese Patent Application Serial No. 2009-204503 filed Sep. 4, 2009, the contents of which are incorporated herein by reference in its entirety.

TECHNICAL FIELD

The present invention relates to an electromagnetic flowmeter that measures a flow rate of fluid to be measured, wherein the flow flows through a measuring pipe, and in particular, to an excitation system and a signal processing system, each of which can realize accurate flow rate measurement.

BACKGROUND

An electromagnetic flowmeter measures a flow rate of electrically conductive fluid to be measured, which flows through a measuring pipe, by converting the flow rate into an electrical signal using an electromagnetic induction phenomenon. FIG. 27 shows a conventional general-form electromagnetic flowmeter. The electromagnetic flowmeter includes: a measuring pipe 1 through which fluid to be measured flows; a pair of electrodes 2a and 2b that are provided in the measuring pipe 1 so as to face each other, so as to be perpendicular to both a magnetic field which is applied to the fluid to be measured and an axis PAX of the measuring pipe 1, and so as to be in contact with the to-be-measured fluid, and detects an electromotive force generated by the magnetic field and the flow of the fluid to be measured; an exciting coil 3 that applies, to the fluid to be measured, the magnetic field that is perpendicular to both an electrode axis EAX connecting the electrodes 2a and 2b and the measuring pipe axis PAX; a signal conversion unit 5 that detects an electromotive force between the electrodes 2a and 2b; and a flow rate output unit 6 that calculates the flow rate of the fluid to be measured on the basis of the inter-electrode electromotive force detected by the signal conversion unit 5.

In the general-form electromagnetic flowmeter shown in FIG. 27, when a plane PLN that is perpendicular to the direction of the measuring pipe axis PAX and includes the electrodes 2a and 2b, is regarded as a boundary in the measuring pipe 1, a magnetic field that is symmetrical with respect to the plane PLN, which is the boundary in the measuring pipe 1, is applied to the fluid to be measured. Further, examples of the excitation system of the exciting coil 3 include a sine wave excitation system that enables high frequency excitation, and a rectangular wave excitation system that is not affected by electromagnetic induction noise and the like.

The sine wave excitation system that uses a sine wave as exciting current of the exciting coil 3 is likely to be affected by commercial frequency noise, but this drawback can be solved by the high frequency excitation system in which the frequency of exciting current is made high. Further, there are advantages that the high frequency excitation system is resistant to 1/f noise such as electrochemical noise or spike noise, and responsiveness (a characteristic of causing a flow rate signal to quickly follow a change in the flow rate) can be also improved.

However, the conventional sine wave excitation system is likely to be affected by noise of an in-phase component. An example of the noise of the in-phase component is a shift of the amplitude of a magnetic field applied to the fluid to be measured. In the conventional electromagnetic flowmeter, when the amplitude of exciting current supplied to the exciting coil 3 changes (shifts) due to variation of a power supply voltage or the like so that the amplitude of the magnetic field applied to the fluid to be measured shifts, the amplitude of the electromotive force between the electrodes changes, and an error occurs in flow rate measurement due to the effect of the shift. Such noise of the in-phase component cannot be eliminated even by using the high frequency excitation system.

On the other hand, the rectangular wave excitation system that uses a rectangular wave as exciting current supplied to the exciting coil 3 is resistant to the noise of the in-phase component. However, in the rectangular wave excitation system, an electromotive force between electrodes is detected at time when a change in the magnetic field stops. However, in case of the exciting current with a high frequency, a detector is required to have high performance. In addition, in the rectangular wave excitation system, in case of the exciting current with high frequency, effects of, the impedance of the exciting coil 3, the responsiveness of the exciting current, the responsiveness of the magnetic field, overcurrent loss at the core of the exciting coil 3 and the measuring pipe 1, and the like, cannot be ignored, and it is difficult to maintain the rectangular wave excitation. As a result, in the rectangular wave excitation system, it is difficult to achieve the high frequency excitation, and improvement of responsiveness with respect to a change in the flow rate and elimination of 1/f noise cannot be achieved.

In addition, since a flow rate is a product of a flow speed and a cross-sectional area of the measuring pipe, the flow rate and the flow speed generally have one-on-one relationship at calibration in an initial state, and obtaining the flow speed is regarded as being equivalent to obtaining the flow rate. Thus, a method for obtaining a flow speed (in order to obtain a flow rate) will be described below.

As an electromagnetic flowmeter that can correct an error in flow rate measurement by eliminating the noise of the in-phase component and can achieve high frequency excitation, the inventors have proposed an asymmetrical excitation electromagnetic flowmeter as shown in FIG. 28 (see Japanese Patent No. 3774218 and Japanese Patent Application Publication No. 2005-300325). Unlike the general-form electromagnetic flowmeter shown in FIG. 27, the asymmetrical excitation electromagnetic flowmeter shown in FIG. 28 extracts a parameter (asymmetrical excitation parameter) that is not affected by a shift of a span, and outputs a flow rate on the basis of the parameter, thereby solving the problem concerning the shift of the span.

Here, a shift of a span will be described with reference to FIG. 29. If the magnitude V of a flow speed measured by an electromagnetic flowmeter changes even when the flow speed of fluid to be measured does not change, it is thought that a shift of the span is a cause of the output change. For example, it is assumed that, in an initial state, the electromagnetic flowmeter is calibrated such that: the output of the electromagnetic flowmeter is 0 (v) when the flow speed of the fluid to be measured is 0; and the output is 1 (v) when the flow speed is 1 (m/sec). The output of the electromagnetic flowmeter is a voltage that represents the magnitude V of the flow speed. Because of such calibration, when the flow speed of the fluid to be measured is 1 (m/sec), the output of the electromagnetic flowmeter should be 1 (v). However, at the time when a certain time t1 has elapsed, the output of the electromagnetic flowmeter may be 1.2 (v) even though the flow speed of the fluid to be measured is maintained at 1 (m/sec).

The reason for this output change is thought to be a shift of the span. The phenomenon of the shift of the span occurs, for example, because the value of the exciting current flowing in the exciting coil cannot be maintained at a constant value due to a change in the ambient temperature of the electromagnetic flowmeter.

However, unlike the general-form electromagnetic flowmeter, an offset needs to be provided between the electrode position and the coil position in an asymmetrical excitation electromagnetic flowmeter as in the configuration shown in FIG. 28. Thus, a detector for use in the general-form electromagnetic flowmeter cannot be used in the asymmetrical excitation electromagnetic flowmeter, and it is necessary to newly design and produce a detector part.

SUMMARY

The present invention is made in order to solve the above problems, and an object of the present invention is to provide an electromagnetic flowmeter that can automatically perform accurate span correction and can perform flow rate measurement with high accuracy, without greatly changing the configuration of a conventional general-form detector.

An electromagnetic flowmeter of the present invention comprises: a measuring pipe through which fluid to be measured flows; an electrode that is provided in the measuring pipe and detects an electromotive force generated by a magnetic field applied to the fluid and a flow of the fluid; an exciting unit that applies, to the fluid, a time-changing magnetic field that is symmetrical about an electrode plane that includes the electrode and is perpendicular to an axial direction of the measuring pipe; a signal line that is connected to the electrode at one end thereof and provided so as to be inclined with respect to a direction of the magnetic field parallel to the electrode plane, so that an electromotive force is generated by a change of the magnetic field with passage of time; a signal conversion unit that is connected to the other end of the signal line and extracts a $\partial A/\partial t$ component that is unrelated to a flow speed of the fluid and arises from a change of the magnetic field with passage of time, from a resultant electromotive force of an electromotive force of the $\partial A/\partial t$ component and an electromotive force of a v×B component that arises from a flow speed of the fluid, wherein the resultant electromotive force is detected by the electrode and the signal line; and a flow rate output unit that eliminates, on the basis of the extracted $\partial A/\partial t$ component, a variation factor as to a span that is a coefficient applied to a magnitude V of the flow speed of the v×B component in the resultant electromotive force, and calculates a flow rate of the fluid on the basis of a result in which the variation factor is eliminated. Further, in one configuration example of the electromagnetic flowmeter of the present invention, the signal line may have a portion extending in the same direction as the axial direction of the measuring pipe.

Further, in one configuration example of the electromagnetic flowmeter of the present invention, the exciting unit may comprise an exciting coil that is provided such that a coil axis is included in the electrode plane, and a power supply unit that supplies exciting current to the exciting coil, and the signal conversion unit extracts the $\partial A/\partial t$ component by obtaining a phase difference or a time difference between the resultant electromotive force and the exciting current. Further, in one configuration example (first embodiment) of the electromagnetic flowmeter of the present invention, the power supply may supply exciting current of first frequency to the exciting coil, the signal conversion unit may extract the $\partial A/\partial t$ component by obtaining a phase difference between the exciting current and a component of the first frequency out of the resultant electromotive force, and the flow rate output unit may eliminate, on the basis of the extracted $\partial A/\partial t$ component, the variation factor as to a span, which is included in the v×B component of the first frequency component of the resultant electromotive force and calculate the flow rate of the fluid on the basis of a result in which the variation factor is eliminated.

Further, in one configuration example of the electromagnetic flowmeter of the present invention, the exciting unit may comprise an exciting coil that is provided such that a coil axis is included in the electrode plane and a power supply that supplies, to the exciting coil, exciting current that simultaneously or alternately provides a plurality of exciting frequencies, and the signal conversion unit may extract the $\partial A/\partial t$ component by obtaining amplitudes and phases of at least two different frequency components which are simultaneously or alternately obtained out of the resultant electromotive force. Further, in one configuration example (second embodiment) of the electromagnetic flowmeter of the present invention, the power supply unit may supply, to the exciting coil, exciting current that simultaneously or alternately provides two different exciting frequencies that are a first frequency and a second frequency, the signal conversion unit may obtain amplitudes and phases of two frequency components of the first and second frequencies out of the resultant electromotive force, and extract an electromotive force difference between the two frequency components as the $\partial A/\partial t$ component on the basis of the amplitudes and the phases, and the flow rate output unit may eliminate, on the basis of the extracted $\partial A/\partial t$ component, a variation factor as to a span, which is included in the v×B component of the first frequency component or that of the second frequency component out of the resultant electromotive force, and calculate the flow rate of the fluid on the basis of a result in which the variation factor is eliminated. Further, in one configuration example of the electromagnetic flowmeter of the present invention, the pair of electrodes may be provided on an axis which is perpendicular to the axis of the measuring pipe, so as to face each other through the axis of the measuring pipe, and the signal line may comprise two signal lines that are connected to the electrodes, respectively, wherein at least one of the two signal lines is provided so as to be inclined with respect to a direction of the magnetic field parallel to the electrode plane, whereby an electromotive force is generated by the change of the magnetic field with passage of time.

Further, in one configuration example of the electromagnetic flowmeter of the present invention, the exciting unit may comprise an exciting coil that is provided such that a coil axis is included in the electrode plane and a power supply that supplies exciting current to the exciting coil, and the signal line may comprise a plurality of signal lines that are provided on paths different from each other, and the signal conversion unit may extract the $\partial A/\partial t$ component by obtaining a sum of or a difference between resultant electromotive forces obtained from the plurality of signal lines. Further, in one configuration example (third embodiment) of the electromagnetic flowmeter of the present invention, the electrode may comprise the pair of electrodes that are provided on an axis which is perpendicular to an axis of the measuring pipe, so as to face each other through the axis of the measuring pipe, the signal line may comprise two signal lines that are connected to the electrodes, respectively, and provided so as to extend from the electrode plane in directions opposite to each other, the signal conversion unit may extract the $\partial A/\partial t$ component by obtaining a sum of resultant electromotive forces obtained from the two signal lines, and the flow rate output unit may eliminate, on the basis of the extracted $\partial A/\partial t$ component, a variation factor as to a span, which is included in a v×B component in a difference between the resultant electromotive forces obtained from the two signal lines, and calculate the flow rate of the fluid on the basis of a result in which the variation factor is eliminated.

Further, in one configuration example of the electromagnetic flowmeter of the present invention, the signal line may comprise a plurality of signal lines that are connected to the same electrode, and the signal conversion unit may extract the ∂A/∂t component by obtaining amplitudes and phases of resultant electromotive forces obtained from at least two of the signal lines, out of resultant electromotive forces obtained from the plurality of signal lines. Further, in one configuration example (fourth embodiment) of the electromagnetic flowmeter of the present invention, the signal line may comprise first and second signal lines that are connected to the same electrode and provided so as to extend from the electrode plane in directions opposite to each other, the signal conversion unit may obtain an amplitude and a phase of each of a first resultant electromotive force obtained from the first signal line and a second resultant electromotive force obtained from the second signal line, and extract an electromotive force difference between the first and second resultant electromotive forces as the ∂A/∂t component on the basis of the amplitudes and the phases, and the flow rate output unit may eliminate, on the basis of the extracted ∂A/∂t component, a variation factor as to a span, which is included in a v×B component of an electromotive force sum of the first and second resultant electromotive forces, and calculate the flow rate of the fluid on the basis of a result in which the variation factor is eliminated. Further, in one configuration example of the electromagnetic flowmeter of the present invention, the pair of electrodes may be provided on an axis which is perpendicular to an axis of the measuring pipe, so as to face each other through the axis of the measuring pipe, and out of signal lines connected to each electrode, at least signal lines connected to one of the electrodes are provided so as to be inclined with respect to a direction of the magnetic field parallel to the electrode plane whereby an electromotive force is generated by a change in the magnetic field with passage of time.

Further, in one configuration example (fifth embodiment) of the electromagnetic flowmeter of the present invention, the electromagnetic flowmeter may further comprise an outer core that covers an outside of the exciting unit, and the signal line may be provided within the outer core so as to be inclined with respect to a direction of the magnetic field parallel to the electrode plane whereby an electromotive force is generated by a change of the magnetic field with passage of time. In one configuration example (fifth embodiment) of the electromagnetic flowmeter of the present invention, the electromagnetic flowmeter may further comprise an outer core that covers an outside of the exciting coil, and the signal line may be provided within the outer core so as to be inclined with respect to a direction of the magnetic field parallel to the electrode plane whereby an electromotive force is generated by a change of the magnetic field with passage of time.

According to the present invention, provided are: the measuring pipe through which the fluid to be measured flows; the electrode that is provided in the measuring pipe and detects an electromotive force generated by a magnetic field applied to the fluid and a flow of the fluid; the exciting unit that applies, to the fluid, a time-changing magnetic field that is symmetrical about the electrode plane that includes the electrode and is perpendicular to the axial direction of the measuring; the signal line that is connected to the electrode at one end thereof and provided so as to be inclined with respect to a direction of a magnetic field parallel to the electrode plane whereby an electromotive force is generated by a change of the magnetic field with passage of time; the signal conversion unit that is connected to the other end of the signal line and extracts a ∂A/∂t component that is unrelated to a flow speed of the fluid and arises from the change of the magnetic field with passage of time, from a resultant electromotive force of an electromotive force of the ∂A/∂t component and an electromotive force of a v×B component that arises from a flow speed of the fluid, wherein the resultant electromotive force is detected by the electrode and the signal line; and the flow rate output unit that eliminates, on the basis of the extracted ∂A/∂t component, a variation factor as to a span that is a coefficient applied to a magnitude V of a flow speed of the v×B component in the resultant electromotive force, and calculates the flow rate of the fluid on the basis of a result in which the variation factor is eliminated. By so doing, accurate span correction can be automatically performed, and flow rate measurement can be performed with high accuracy. In the present invention, when the measuring pipe, the electrode, and the exciting coil, which are components of a detector of a conventional general-form electromagnetic flowmeter, are used, and the signal line is provided such that an electromotive force is generated by a change of the magnetic field with passage of time, accurate span correction can be automatically performed. Therefore, the effect that can be obtained only in an asymmetrical excitation electromagnetic flowmeter, can be achieved in a general-form electromagnetic flowmeter without greatly changing the configuration of a detector thereof.

Further, in the present invention, since the signal line is provided within the outer core, the ∂A/∂t component can be efficiently detected.

BRIEF DESCRIPTION OF THE DRAWINGS

Other features and advantages of the present electromagnetic flowmeter will be apparent from the ensuing description, taken in conjunction with the accompanying drawings, in which:

FIG. 17 is a block diagram showing a configuration of an electromagnetic flowmeter according to a third embodiment of the present invention;

FIG. 24 is a cross-sectional view showing another example of the electrodes used in the electromagnetic flowmeters according to the first to fifth embodiments of the present invention;

FIG. 25 is a diagram showing another example of arrangement of signal lines in the first and second embodiments of the present invention;

FIG. 26 is a diagram showing another example of arrangement of signal lines in the fourth embodiment of the present invention;

FIG. 27 is a block diagram showing a configuration of a conventional general-form electromagnetic flowmeter;

DESCRIPTION

Physical Phenomenon and Mathematical Basic Knowledge

First, a physical phenomenon required for illustrating a conventional technology will be described below. When an object moves in a time-changing magnetic field, the following two types of electric fields are generated by electromagnetic induction: (a) an electromotive force $E^{(i)}=-\partial A/\partial t$, which is generated by a change of the magnetic field with passage of time; and (b) an electromotive force $E^{(v)}=v \times B$, which is generated by the object moving in the magnetic field. "v×B" indicates the outer product of v and B, and "∂A/∂t" indicates the partial differential of A with respect to time. "v", "B", and "A" correspond to those set forth below, respectively, and are vectors having directions in three dimensions (x, y, z) (v: flow speed, B: magnetic flux density, A: vector potential (whose relation with the magnetic flux density is represented by B=rotA)). Note that the three-dimensional vectors in this case are different in meaning from vectors on a complex plane, which will be described later.

Description of generally known mathematical basic knowledge will give below. A cosine wave P·cos(ω·t) and a sine wave Q·sin(ω·t) that have the same frequency and different amplitudes, are combined into a cosine wave as described below. P and Q indicate amplitudes, and (1) indicates an angular frequency.

$$P \cdot \cos(\omega \cdot t) + Q \cdot \sin(\omega \cdot t) = (P^2+Q^2)^{1/2} \cdot \cos(\omega \cdot t - \in), \text{ where}$$
$$\in = \tan^{-1}(Q/P) \quad (1)$$

In order to analyze the combining in the equation (1), it is convenient to perform mapping on a complex coordinate plane so as to plot an amplitude P of the cosine wave P·cos (ω·t) along a real axis and so as to plot an amplitude Q of the sine wave Q·sin(ω·t) along an imaginary axis. In other words, on the complex coordinate plane, a distance $(P^2+Q^2)^{1/2}$ from the origin gives an amplitude of the resultant wave, and an angle $\in = \tan^{-1}(Q/P)$ with the real axis gives the phase difference between the resultant wave and ω·t.

Further, on the complex coordinate plane, the following relational expression is satisfied.

$$L \cdot \exp(j \cdot \in) = L \cdot \cos(\in) + j \cdot L \cdot \sin(\in) \quad (2)$$

The equation (2) is an expression concerning a complex vector, and "j" indicates an imaginary unit. L gives the length of the complex vector, ands gives the direction of the complex vector. Thus, in order to analyze a geometrical relation on the complex coordinate plane, it is convenient to use conversion to a complex vector.

Structural Mechanism of Conventional Technique

Figure 1:
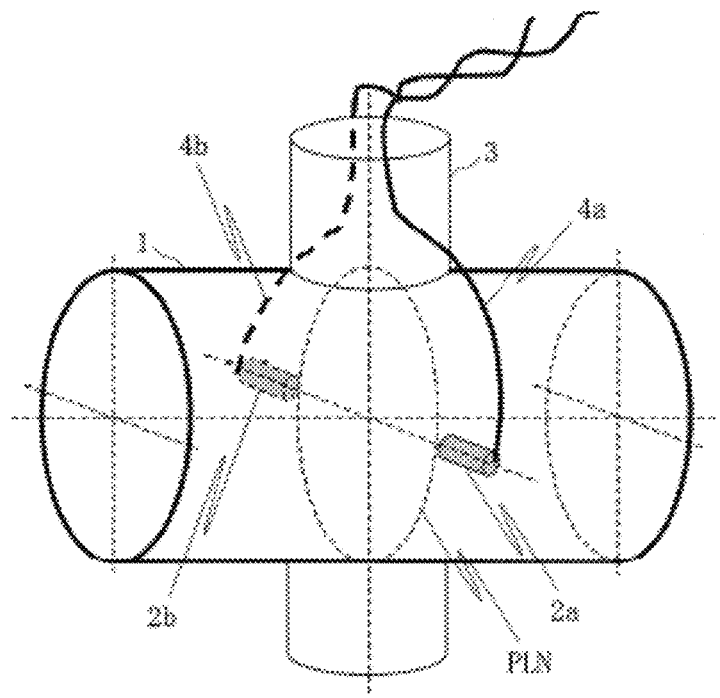
FIG. 1 is a diagram showing arrangement of signal lines of a conventional general-form electromagnetic flowmeter.

Description of the relation between the above physical phenomenon and a structural mechanism of the conventional technique will be given below. An asymmetrical excitation electromagnetic flowmeter detects a ∂A/∂t component generated in a fluid and corrects a flow rate. Thus, there is an offset between a coil plane and an electrode plane, and a detector of the asymmetrical excitation electromagnetic flowmeter is different in structure from that of a general-form electromagnetic flowmeter. In addition, the detector used in the general-form electromagnetic flowmeter has a structure so as not to detect a ∂A/∂t component as much as possible. In other words, in addition to a magnetic field being symmetrical about a plane PLN that includes electrodes 2a and 2b and is perpendicular to the direction of a measuring pipe axis, the detector has a structure in which signal lines 4a and 4b are located such that areas of the signal lines 4a and 4b which are linked with magnetic flux generated from an exciting coil 3 are reduced as much as possible as shown in FIG. 1. By this structure, a ∂A/∂t component is prevented from being generated in the signal lines 4a and 4b.

Point on which the Invention Focuses

The present invention focuses on the fact that a ∂A/∂t component can be generated in the signal lines or the electrodes, by locating the signal lines so as to be linked with a magnetic field in a conventional general-form detector in which an exciting coil and the electrodes are present on the same plane, and the same effect of span correction as that in an asymmetrical excitation electromagnetic flowmeter can be obtained by using the ∂A/∂t component.

Basic Principle of the Invention

The above described two types of electromotive forces, $E^{(i)}=-\partial A/\partial t$ and $E^{(v)}=v \times B$, are generated in the fluid. However, in the case of the general-form electromagnetic flowmeter in which a magnetic field is symmetrical with respect to the plane PLN, the electromotive force, $E^{(i)}=-\partial A/\partial t$, which is generated by a change of the magnetic field with passage of time, is 0 at the electrode position due to the symmetry. On the other hand, when the signal lines are located so as to be linked with the magnetic flux, an electromotive force is generated in the electrodes and the signal lines by a change of the magnetic field with passage of time. Finally, the electromotive force that passes through the signal lines and is detected by the signal conversion unit, is an electromotive force obtained by combining the v×B component generated in the fluid and the ∂A/∂t component generated in the electrodes and the signal lines.

In the following description, in order to explain how a generated electromotive force behaves and how the present invention uses the behavior, the above mapping onto the complex coordinate plane and the geometrical analysis based on a complex vector, are used.

First Configuration

Figure 2:
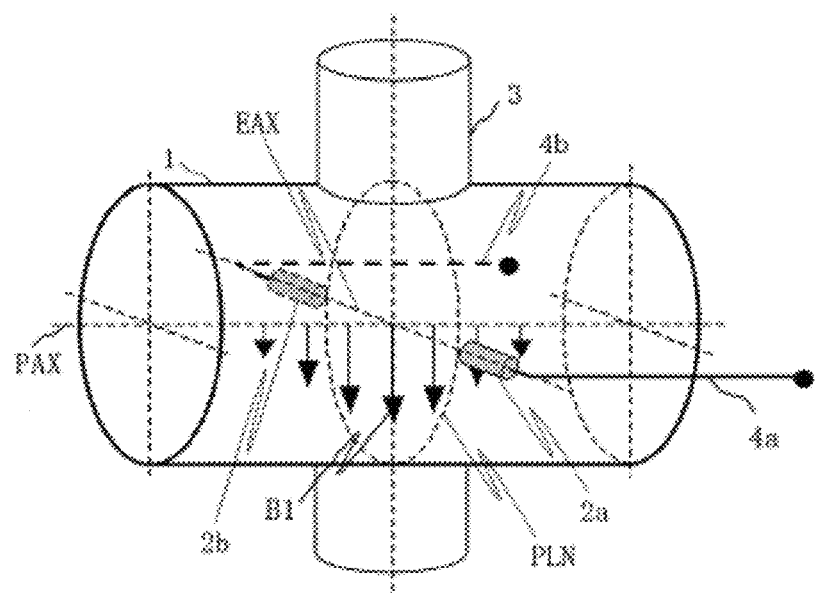
FIG. 2 is a block diagram for illustrating a principle of a first configuration of an electromagnetic flowmeter of the present invention.

A first configuration of an electromagnetic flowmeter of the present invention will be described below. FIG. 2 is a block diagram for illustrating a principle of the first configuration. The electromagnetic flowmeter in FIG. 2 includes a measuring pipe 1 through which fluid to be measured flows; a pair of electrodes 2a and 2b that are located in the measuring pipe 1 so as to face each other, so as to be perpendicular to both a magnetic field applied to the fluid to be measured and an axis PAX of the measuring pipe 1, and so as to be in contact with the fluid to be measured, and detect an electromotive force generated by the magnetic field and the flow of the fluid to be measured; an exciting coil 3 that, when a plane PLN, which is perpendicular to the direction of the measuring pipe axis PAX and includes the electrodes 2a and 2b, is regarded as a boundary in the measuring pipe 1, applies to the fluid to be measured a time-changing magnetic field that is symmetrical with respect to the boundary in the measuring pipe 1; and signal lines 4a and 4b that are located so as to be linked with magnetic flux generated by the exciting coil 3 and connect the electrodes 2a and 2b to a signal conversion unit (not shown). In the first configuration, the signal lines 4a and 4b are located on the same side of the plane PLN including the electrodes 2a and 2b as each other.

Second Configuration

Figure 3:
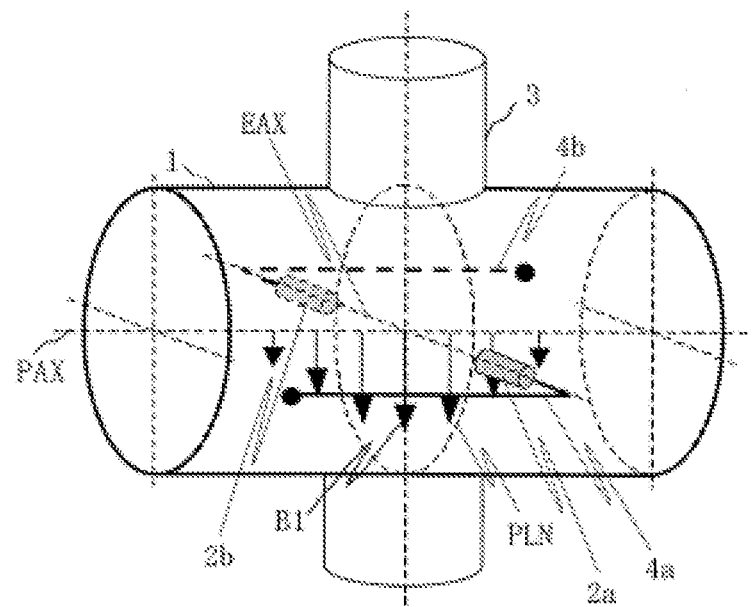
FIG. 3 is a block diagram for illustrating a principle of a second configuration of the electromagnetic flowmeter of the present invention.

Description of a second configuration of the electromagnetic flowmeter of the present invention will be given below. FIG. 3 is a block diagram for illustrating a principle of the second configuration. In the second configuration, signal lines 4a and 4b are located on different sides of a plane PLN including electrodes 2a and 2b from each other, so as to be substantially rotationally symmetrical with respect to the axis of an exciting coil 3.

Third Configuration

Figure 4:
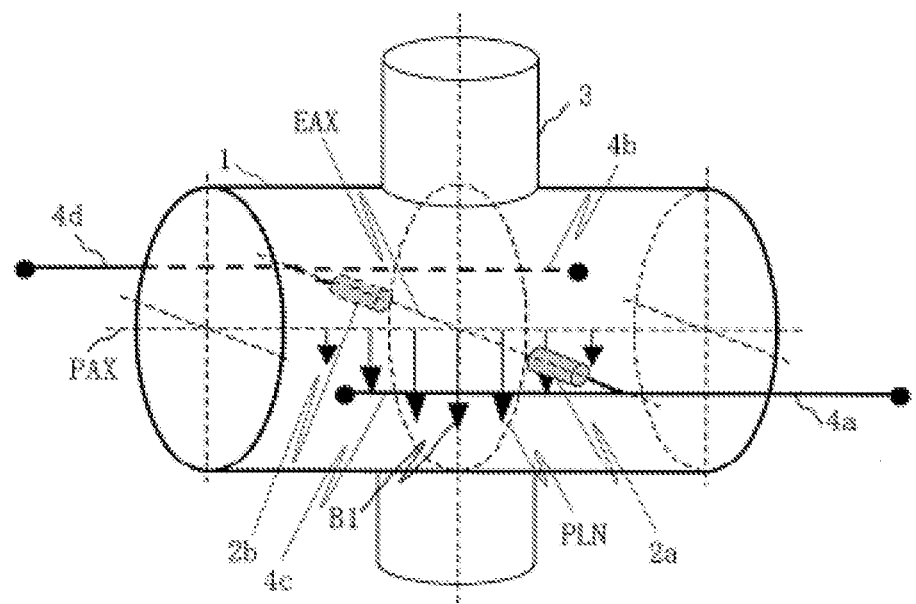
FIG. 4 is a block diagram for illustrating a principle of a third configuration of the electromagnetic flowmeter of the present invention.

A third configuration of the electromagnetic flowmeter of the present invention will be described below. FIG. 4 is a block diagram for illustrating a principle of the third configuration. In the third configuration, a first signal line 4a and a second signal line 4c are connected to one electrode 2a, and are located on the different sides of a plane PLN including electrodes 2a and 2b from each other. Similarly, a first signal line 4b and a second signal line 4d are connected to the electrode 2b, and are located on the different sides of the plane PLN including the electrodes 2a and 2b from each other. The first signal lines 4a and 4b and the second signal lines 4c and 4d are located so as to be substantially symmetrical with respect to the plane PLN including the electrodes 2a and 2b.

In the first to third configurations, of the magnetic field generated from the exciting coil 3, a magnetic field component (magnetic flux density) B1 that is perpendicular to both an electrode axis EAX connecting the electrodes 2a and 2b and the measuring pipe axis PAX on the electrode axis EAX, is given as set forth below.

$$B1 = b1 \cdot \cos(\omega 0 \cdot t - \theta 1) \tag{3}$$

In the equation (3), "b1" indicates the amplitude of the magnetic flux density B1; "ω0" indicates an angular frequency; and "θ1" indicates the phase difference (phase lag) between the magnetic flux density B1 and ω0·t. Hereinafter, the magnetic flux density B1 is referred to as magnetic field B1.

Electromotive Force Resulting from Change in Magnetic Field

First, an electromotive force that results from a change in the magnetic field and is unrelated to the flow speed of the fluid to be measured will be described concerning the first to third configurations. The electromotive force resulting from the change in the magnetic field depends on a time derivative dB/dt of the magnetic field, and thus the magnetic field B1 generated from the exciting coil 3 is differentiated as shown in the following equation:

$$dB1/dt = -\omega 0 \cdot b1 \cdot \sin(\omega 0 \cdot t - \theta 1) \tag{4}$$

Figure 5:
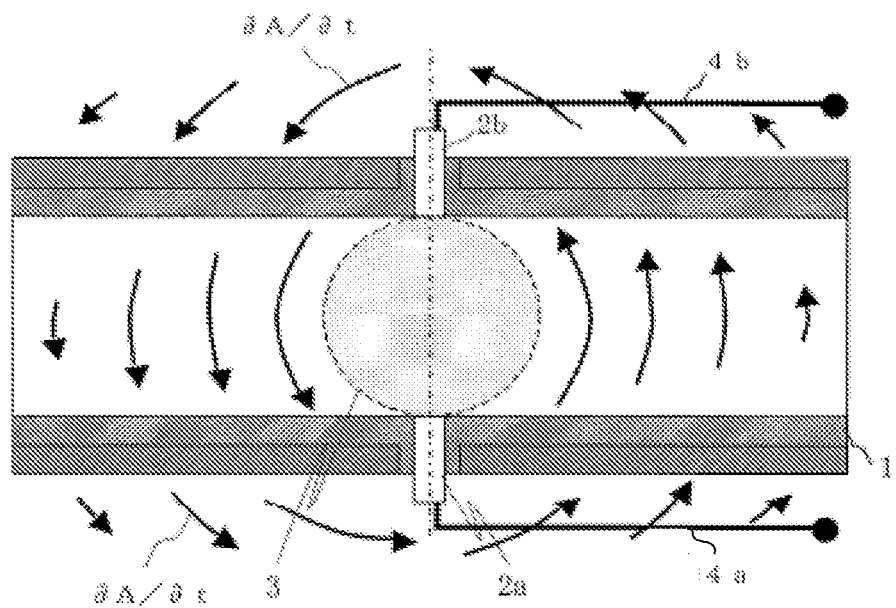
FIG. 5 is a top view of a distribution of a ∂A/∂t component in the first configuration of the electromagnetic flowmeter of the present invention.
Figure 6:
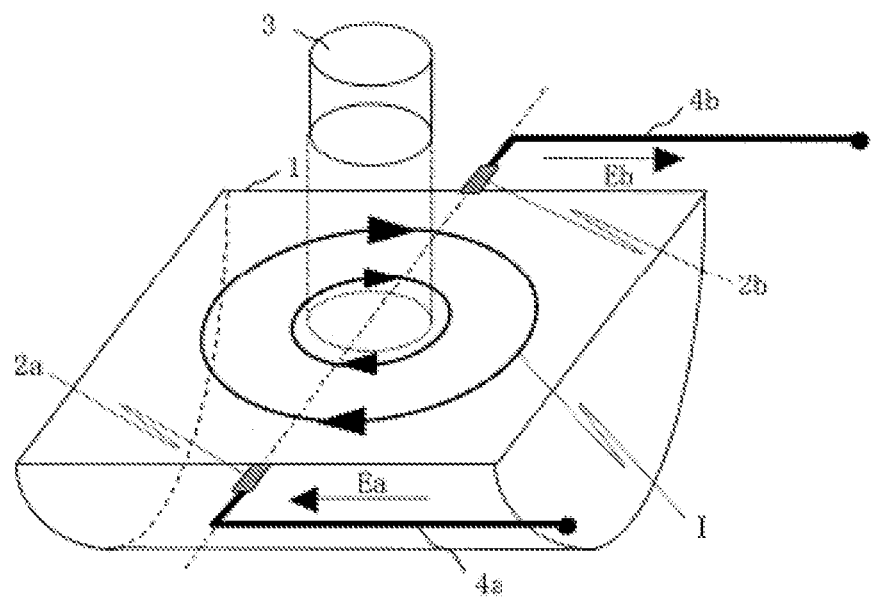
FIG. 6 is a diagram showing eddy current and electromotive forces when the flow rate of fluid to be measured is 0 in the first configuration of the electromagnetic flowmeter of the present invention.

When the flow speed of the fluid to be measured is 0, an electromotive force generated by the magnetic field B1 includes only the component resulting from the change in the magnetic field B1. In this case, in the signal line arrangement in the first configuration as shown in FIG. 2, the distribution of the ∂A/∂t component is shown in FIG. 5, when viewed from above the electromagnetic flowmeter, and electromotive forces Ea and Eb are generated as shown in FIG. 6. Thus, within the plane including the electrode axis EAX and the measuring pipe axis PAX, an inter-electrode electromotive force that is generated in the fluid by a change in the magnetic field B1 (and that is unrelated to the flow speed) is 0, but the electromotive forces Ea and Eb are generated in the signal lines 4a and 4b, respectively, by the change in the magnetic field B1. Note that, in FIG. 6, "I" indicates eddy current generated by the change in the magnetic field B1.

At this time, when a direction from an end of the signal line to the electrode is defined as a negative direction, the electromotive force Eb generated in the signal line 4b is represented by a value obtained by multiplying a time derivative −dB1/dt of a magnetic field whose direction is taken into consideration, by a coefficient kb (a complex number that is related to the arrangement of the electrode 2b and the signal line 4b) as shown in the following equation:

$$Eb = kb \cdot \omega 0 \cdot b1 \cdot \sin(\omega 0 \cdot t - \theta 1) \tag{5}$$

The equation (5) is rewritten to the following equation:

$$Eb = kb \cdot \omega 0 \cdot b1 \cdot \{\sin(-\theta 1)\} \cdot \cos(\omega 0 \cdot t) + kb \cdot \omega 0 \cdot b1 \cdot \quad (6)$$
$$\{\cos(-\theta 1)\} \cdot \sin(\omega 0 \cdot t)$$
$$= kb \cdot \omega 0 \cdot b1 \cdot \{-\sin(\theta 1)\} \cdot \cos(\omega 0 \cdot t) + kb \cdot \omega 0 \cdot b1 \cdot$$
$$\{\cos(\theta 1)\} \cdot \sin(\omega 0 \cdot t)$$

Here, when the equation (6) is mapped on the complex coordinate plane with reference to $\omega 0 \cdot t$, a real axis component Ebx and an imaginary axis component Eby are represented by the following equations:

$$Ebx = kb \cdot \omega 0 \cdot b1 \cdot \{-\sin(\theta 1)\} \quad (7)$$
$$= kb \cdot \omega 0 \cdot b1 \cdot \{\cos(\pi/2 + \theta 1)\}$$

$$Eby = kb \cdot \omega 0 \cdot b1 \cdot \{\cos(\theta 1)\} \quad (8)$$
$$= kb \cdot \omega 0 \cdot b1 \cdot \{\sin(\pi/2 + \theta 1)\}$$

Further, Ebx and Eby shown in the equations (7) and (8) are rewritten to a complex vector Ebc as shown in the following equation:

$$Ebc = Ebx + j \cdot Eby \quad (9)$$
$$= kb \cdot \omega 0 \cdot b1 \cdot \{\cos(\pi/2 + \theta 1)\} +$$
$$j \cdot kb \cdot \omega 0 \cdot b1 \cdot \{\sin(\pi/2 + \theta 1)\}$$
$$= kb \cdot \omega 0 \cdot b1 \cdot \{\cos(\pi/2 + \theta 1) + j \cdot \sin(\pi/2 + \theta 1)\}$$
$$= kb \cdot \omega 0 \cdot b1 \cdot \exp\{j \cdot (\pi/2 + \theta 1)\}$$

Further, when the coefficient kb described above is rewritten to a complex vector, the following equation is obtained:

$$kb = rkb \cdot \cos(\theta b) + j \cdot rkb \cdot \sin(\theta b) \quad (10)$$
$$= rkb \cdot \exp(j \cdot \theta b)$$

In the equation (10), "rkb" indicates a proportional coefficient, and "$\theta b$" indicates the angle of the vector kb with respect to the real axis.

The equation (10) is substituted into the equation (9) to obtain an electromotive force Ebc (an electromotive force that results from only a change in the magnetic field B1 with passage of time) that is obtained by rewriting the electromotive force Eb generated in the signal line 4b to a complex vector, as shown below.

$$Ebc = rkb \cdot \exp(j \cdot \theta b) \cdot \omega 0 \cdot b1 \cdot \exp\{j \cdot (\pi/2 + \theta 1)\} \quad (11)$$
$$= rkb \cdot \omega 0 \cdot b1 \cdot \exp\{j \cdot (\pi/2 + \theta 1 + \theta b)\}$$

Similarly, the electromotive force Ea generated in the signal line 4a is expressed as a value obtained by multiplying the time derivative dB1/dt of the magnetic field B1 whose direction is taken into consideration, by a coefficient ka (a complex number that relates to the arrangement of the electrode 2a and the signal line 4a). The coefficient ka can be rewritten to a complex vector as shown in the following equation:

$$ka = rka \cdot \exp(j \cdot \theta a) \quad (12)$$

In the equation (12), "rka" indicates a proportional coefficient, and "$\theta a$" indicates the angle of the vector ka with respect to the real axis.

Using the equation (11) for reference, an electromotive force Eac (an electromotive force that results from only a change in the magnetic field B1 with passage of time) that is obtained by rewriting the electromotive force Ea generated in the signal line 4a to a complex vector, is represented on the basis of the equation (12) as follows:

$$Eac = rka \cdot \omega 0 \cdot b1 \cdot \exp\{j \cdot (\pi/2 + \theta 1 + \theta a)\} \quad (13)$$

When difference between electromotive forces at an end of the signal line 4b and an end of the signal line 4a, which are generated only by the change in the magnetic field B1 with passage of time, is indicated by "Ecd", the electromotive force difference Ecd is the difference between the electromotive forces Ebc and Eac and is represented by the following equation:

$$Ecd = Ebc - Eac \quad (14)$$
$$= rkb \cdot \omega 0 \cdot b1 \cdot \exp\{j \cdot (\pi/2 + \theta 1 + \theta b)\} +$$
$$rka \cdot \omega 0 \cdot b1 \cdot \exp\{j \cdot (\pi/2 + \theta 1 + \theta a)\}$$
$$= \{rkb \cdot \exp(j \cdot \theta b) + rka \cdot \exp(j \cdot \theta a)\} \cdot$$
$$\omega 0 \cdot b1 \cdot \exp\{j \cdot (\pi/2 + \theta 1)\}$$

Further, when a sum of the electromotive forces at the end of the signal line 4b and the end of the signal line 4a, which are generated only by the change in the magnetic field B1 with passage of time, is indicated by "Ecs", the electromotive force sum Ecs is represented by the following equation:

$$Ecs = Ebc + Eac \quad (15)$$
$$= rkb \cdot \omega 0 \cdot b1 \cdot \exp\{j \cdot (\pi/2 + \theta 1 + \theta b)\} -$$
$$rka \cdot \omega 0 \cdot b1 \cdot \exp\{j \cdot (\pi/2 + \theta 1 + \theta a)\}$$
$$= \{rkb \cdot \exp(j \cdot \theta b) - rka \cdot \exp(j \cdot \theta a)\} \cdot$$
$$\omega 0 \cdot b1 \cdot \exp\{j \cdot (\pi/2 + \theta 1)\}$$

Here, in order to make it easy to handle the equation, the sum of two vectors of $rkb \cdot \exp(j \cdot \theta b)$ and $rka \cdot \exp(j \cdot \theta a)$ is rewritten to $rks \cdot \exp(j \cdot \theta s)$ as shown in equation (16), and the difference between the two vectors of $rkb \cdot \exp(j \cdot \theta b)$ and $rka \cdot \exp(j \cdot \theta a)$ is rewritten to $rkd \cdot \exp(j \cdot \theta d)$ as shown in equation (17).

$$rkb \cdot \exp(j \cdot \theta b) + rka \cdot \exp(j \cdot \theta a) = rks \cdot \exp(j \cdot \theta s) \quad (16)$$

$$rkb \cdot \exp(j \cdot \theta b) - rka \cdot \exp(j \cdot \theta a) = rkd \cdot \exp(j \cdot \theta d) \quad (17)$$

The electromotive force difference Ecd shown in (14) is rewritten by using the equation (16) as shown in equation (18), and the electromotive force sum Ecs shown in (15) is rewritten by using the equation (17) as shown in equation (19).

$$Ecd = \{rkb \cdot \exp(j \cdot \theta b) + rka \cdot \exp(j \cdot \theta a)\} \cdot \quad (18)$$
$$\omega 0 \cdot b1 \cdot \exp\{j \cdot (\pi/2 + \theta 1)\}$$
$$= rks \cdot \omega 0 \cdot b1 \cdot \exp\{j \cdot (\pi/2 + \theta 1 + \theta s)\}$$

$$Ecs = \{rkb \cdot \exp(j \cdot \theta b) - rka \cdot \exp(j \cdot \theta a)\} \cdot \quad (19)$$
$$\omega 0 \cdot b1 \cdot \exp\{j \cdot (\pi/2 + \theta 1)\}$$
$$= rkd \cdot \omega 0 \cdot b1 \cdot \exp\{j \cdot (\pi/2 + \theta 1 + \theta d)\}$$

In this manner, concerning the first configuration, the electromotive force resulting from only the change in the magnetic field B1 can be obtained.

Figure 7:
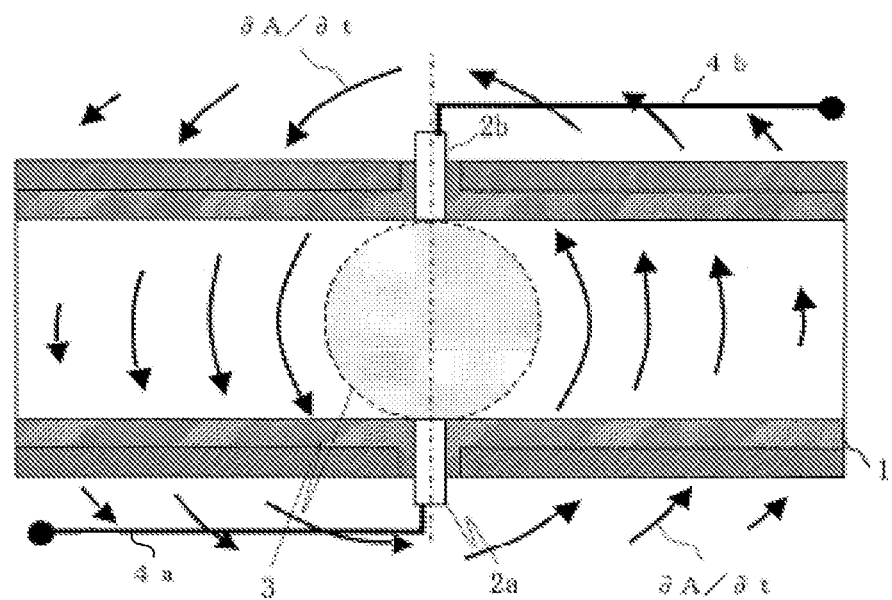
FIG. 7 is a top view of a distribution of a ∂A/∂t component in the second configuration of the electromagnetic flowmeter of the present invention.
Figure 8:
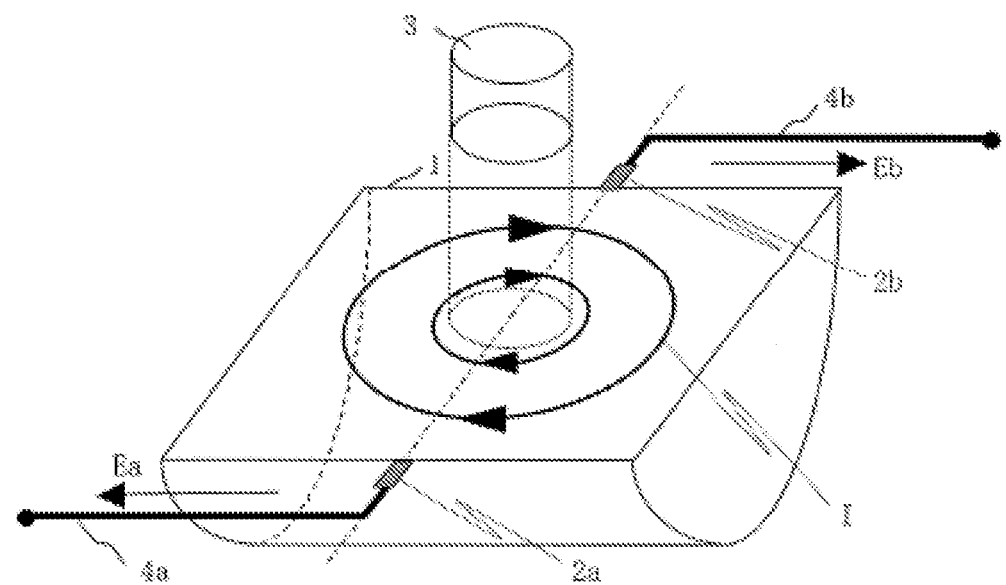
FIG. 8 is a view showing eddy current and electromotive forces when the flow rate of fluid to be measured is 0 in the second configuration of the electromagnetic flowmeter of the present invention.

Concerning the second configuration, description of an electromotive force resulting from only a change in the magnetic field B1 will be given below. When the flow speed of the fluid to be measured is 0, in the signal line arrangement in the second configuration as shown in FIG. 3, the distribution of the ∂A/∂t component is shown in FIG. 7, when viewed from above the electromagnetic flowmeter, and electromotive forces Ea and Eb are generated in the signal lines 4a and 4b, respectively, as shown in FIG. 8.

Thus, an electromotive force EacR obtained by rewriting the electromotive force Ea generated in the signal line 4a in the case of the second configuration to a complex vector, is represented as follows, wherein the sign is opposite to that of the electromotive force Eac shown in (13):

$$EacR = rka \cdot \omega 0 \cdot b1 \cdot \exp\{j \cdot (\pi/2 + \theta 1 + \theta a)\} \quad (20)$$

An electromotive force Ebc obtained by rewriting the electromotive force Eb generated in the signal line 4b to a complex vector, is shown in the equation (11). When the difference between the electromotive forces at an end of the signal line 4b and an end of the signal line 4a, which are generated by only a change in the magnetic field B1 with passage of time, is indicated by "EcdR", the electromotive force difference EcdR is represented by the following equation, using the equation (14) for reference:

$$\begin{aligned}EcdR &= Ebc - EacR \\ &= rkb \cdot \omega 0 \cdot b1 \cdot \exp\{j \cdot (\pi/2 + \theta 1 + \theta b)\} - \\ &\quad rka \cdot \omega 0 \cdot b1 \cdot \exp\{j \cdot (\pi/2 + \theta 1 + \theta a)\} \\ &= \{rkb \cdot \exp(j \cdot \theta b) - rka \cdot \exp(j \cdot \theta a)\} \cdot \\ &\quad \omega 0 \cdot b1 \cdot \exp\{j \cdot (\pi/2 + \theta 1)\}\end{aligned} \quad (21)$$

Further, when the sum of the electromotive forces at the end of the signal line 4b and the end of the signal line 4a, which are generated by only the change in the magnetic field B1 with passage of time, is indicated by "EcsR", the electromotive force sum EcsR is represented by the following equation, using the equation (15) for reference:

$$\begin{aligned}EcsR &= Ebc + EacR \\ &= rkb \cdot \omega 0 \cdot b1 \cdot \exp\{j \cdot (\pi/2 + \theta 1 + \theta b)\} + \\ &\quad rka \cdot \omega 0 \cdot b1 \cdot \exp\{j \cdot (\pi/2 + \theta 1 + \theta a)\} \\ &= \{rkb \cdot \exp(j \cdot \theta b) + rka \cdot \exp(j \cdot \theta a)\} \cdot \\ &\quad \omega 0 \cdot b1 \cdot \exp\{j \cdot (\pi/2 + \theta 1)\}\end{aligned} \quad (22)$$

Here, similarly to the cases of the equations (14) and (15), in order to make it easy to handle the equation, the electromotive force difference EcdR shown in (21) is rewritten by using the equation (17) as shown in equation (23), and the electromotive force sum EcsR shown in the equation (22) is rewritten by using the equation (16) as shown in equation (24).

$$\begin{aligned}EcdR &= \{rkb \cdot \exp(j \cdot \theta b) - rka \cdot \exp(j \cdot \theta a)\} \cdot \\ &\quad \omega 0 \cdot b1 \cdot \exp\{j \cdot (\pi/2 + \theta 1)\} \\ &= rkd \cdot \omega 0 \cdot b1 \cdot \exp\{j \cdot (\pi/2 + \theta 1 + \theta d)\}\end{aligned} \quad (23)$$

$$\begin{aligned}EcsR &= \{rkb \cdot \exp(j \cdot \theta b) + rka \cdot \exp(j \cdot \theta a)\} \cdot \\ &\quad \omega 0 \cdot b1 \cdot \exp\{j \cdot (\pi/2 + \theta 1)\} \\ &= rks \cdot \omega 0 \cdot b1 \cdot \exp\{j \cdot (\pi/2 + \theta 1 + \theta s)\}\end{aligned} \quad (24)$$

In this manner, concerning the second configuration, the electromotive force resulting from only the change in the magnetic field B1 can be obtained.

Figure 9:
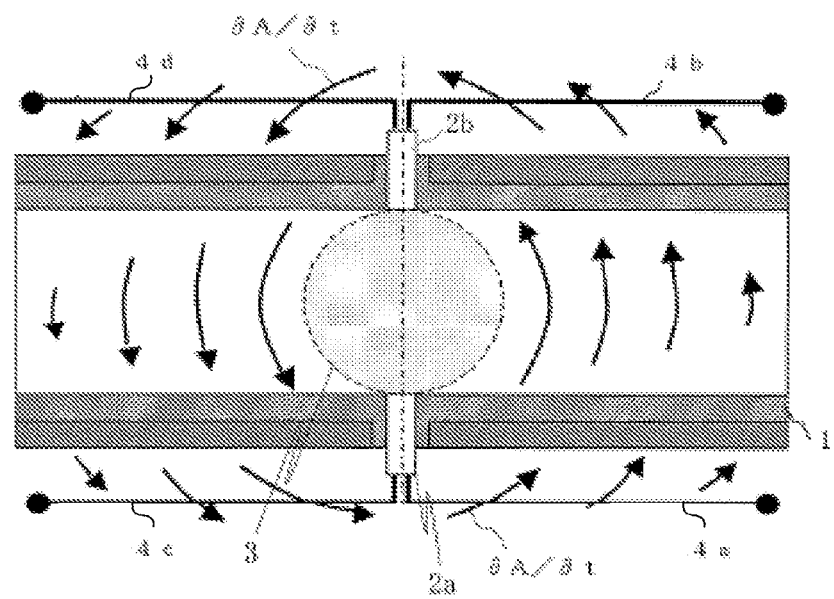
FIG. 9 is a top view of a distribution of a ∂A/∂t component in the third configuration of the electromagnetic flowmeter of the present invention.
Figure 10:
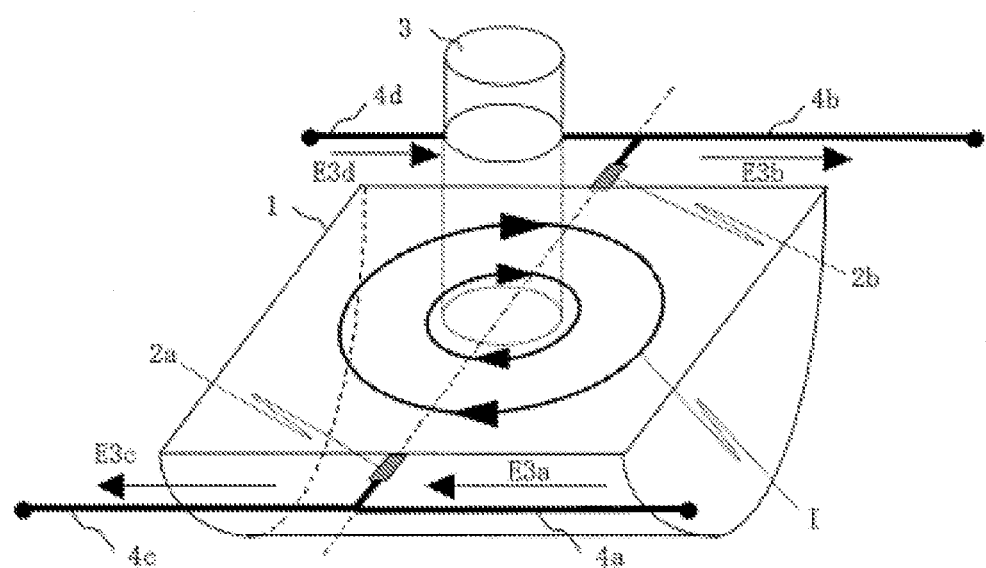
FIG. 10 is a diagram showing eddy current and electromotive forces when the flow rate of fluid to be measured is 0 in the third configuration of the electromagnetic flowmeter of the present invention.

Concerning the third configuration, description of an electromotive force resulting from only a change in the magnetic field B1 will be given below. When the flow speed of the fluid to be measured is 0, in the signal line arrangement in the third configuration as shown in FIG. 4, the distribution of the ∂A/∂t component is shown in FIG. 9, when viewed from above the electromagnetic flowmeter, and electromotive forces E3a, E3b, E3c, and E3d are generated in the signal lines 4a, 4b, 4c, and 4d, respectively, as shown in FIG. 10.

At this time, when the difference between the electromotive forces at the end of the first signal line 4b and the end of the first signal line 4a, which are generated by only a change in the magnetic field B1 with passage of time, is indicated by "Ecd1", the electromotive force difference Ecd1 is represented by the same equation (18) as that in the first configuration. Further, when "rks" is replaced by "rks1" and "θs" is replaced by "θs1" in the equation (18), the electromotive force difference Ecd1 is represented by the following equation:

$$Ecd1 = rks1 \omega 0 \cdot b1 \cdot \exp\{j \cdot (\pi/2 + \theta 1 + \theta s1)\} \quad (25)$$

When the difference of the electromotive forces at the end of the second signal line 4d and the end of the second signal line 4c, which are generated by only the change in the magnetic field B1 with passage of time, is indicated by "Ecd2", the electromotive force difference Ecd2 is represented by the following equation, by using the equation (25) for reference, replacing "rks1" by "rks2", replacing "θs1" by "θs2", and assigning a minus sign in view of a direction with respect to the electromotive force in the first signal line:

$$Ecd2 = -rks2 \cdot \omega 0 \cdot b1 \cdot \exp\{j \cdot (\pi/2 + \theta 1 + \theta s2)\} \quad (26)$$

In this manner, concerning the third configuration, the electromotive force resulting from only the change in the magnetic field B1 can be obtained.

Electromotive Force Resulting from Flow Speed

Figure 11:
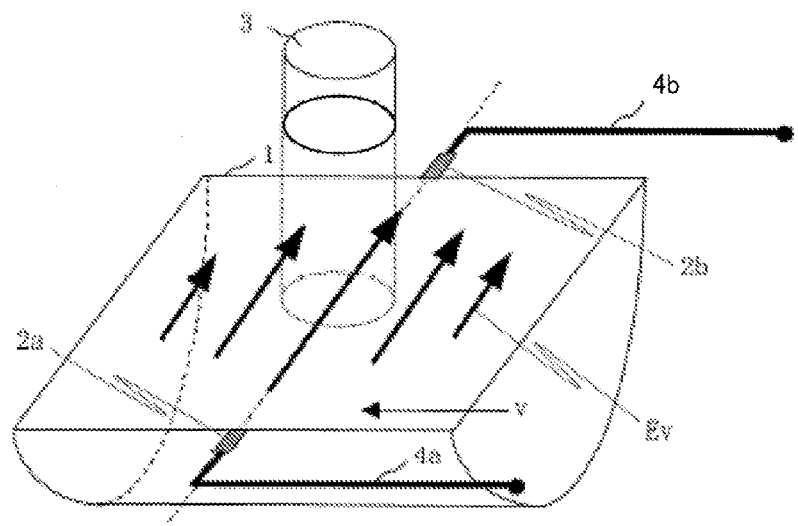
FIG. 11 is a diagram showing an inter-electrode electromotive force when the flow rate of the fluid to be measured is not 0 in the first configuration of the electromagnetic flowmeter of the present invention.

Concerning the first to third configurations, description of an inter-signal line electromotive force resulting from the flow speed of the fluid to be measured and the magnetic field B1 will be given below. When the magnitude of the flow speed of the fluid to be measured is V (V≠0), in the first configuration as shown in FIG. 2, a component v×B1 resulting from a flow speed vector v of the fluid to be measured is generated in addition to the electromotive force at a flow speed of 0. In other words, an inter-electrode electromotive force Ev is generated by the flow speed vector v of the fluid to be measured and the magnetic field B1, as shown in FIG. 11. The direction of Ev is defined as a positive direction.

At this time, the inter-signal line electromotive force detected at the ends of the signal lines 4a and 4b is the same as the inter-electrode electromotive force Ev detected at the electrodes 2a and 2b. The inter-electrode electromotive force Ev is expressed by a value obtained by multiplying the magnetic field B1 by the magnitude V of the flow speed and a coefficient kv (a complex number that relates to the electrical conductivity and the dielectric constant of the fluid to be measured and the structure of the measuring pipe 1 including the arrangement of the electrodes 2a and 2d), as shown in the following equation:

$$Ev = kv \cdot V \cdot \{b1 \cdot \cos(\omega 0 \cdot t - \theta 1)\} \tag{27}$$

The equation (27) is rewritten as follows:

$$\begin{aligned}Ev &= kv \cdot V \cdot b1 \cdot \cos(\omega 0 \cdot t) \cdot \cos(-\theta 1) - \\ &\quad kv \cdot V \cdot b1 \cdot \sin(\omega 0 \cdot t) \cdot \sin(-\theta 1) \\ &= kv \cdot V \cdot b1 \cdot \{\cos(\theta 1)\} \cdot \cos(\omega 0 \cdot t) + \\ &\quad kv \cdot V \cdot b1 \cdot \{\sin(\theta 1)\} \cdot \sin(\omega 0 \cdot t)\end{aligned} \tag{28}$$

Here, when the equation (28) is mapped on the complex coordinate plane with reference to "$\omega 0 \cdot t$", a real axis component Evx and an imaginary axis component Evy are represented by the following equations:

$$Evx = kv \cdot V \cdot b1 \cdot \cos(\theta 1) \tag{29}$$

$$Evy = kv \cdot V \cdot b1 \cdot \sin(\theta 1) \tag{30}$$

Further, Evx and Evy shown in (29) and (30) are rewritten to a complex vector Evc shown in the following equation:

$$\begin{aligned}Evc &= Evx + j \cdot Evy \\ &= kv \cdot V \cdot b1 \cdot \cos(\theta 1) + j \cdot kv \cdot V \cdot b1 \cdot \sin(\theta 1) \\ &= kv \cdot V \cdot b1 \cdot \{\cos(\theta 1) + j \cdot \sin(\theta 1)\} \\ &= kv \cdot V \cdot b1 \cdot \exp(j \cdot \theta 1)\end{aligned} \tag{31}$$

Further, the coefficient kv described above is rewritten to a complex vector to obtain the following equation:

$$\begin{aligned}kv &= rkv \cdot \cos(\theta v) + j \cdot rkv \cdot \sin(\theta v) \\ &= rkv \cdot \exp(j \cdot \theta v)\end{aligned} \tag{32}$$

In the equation (32), "rkv" indicates a proportional coefficient, and "$\theta v$" indicates the angle of the vector kv with respect to the real axis.

The equation (32) is substituted into the equation (31) to obtain an inter-electrode electromotive force Evc obtained by rewriting the inter-electrode electromotive force Ev to a complex vector, as shown below.

$$\begin{aligned}Evc &= kv \cdot V \cdot b1 \cdot \exp(j \cdot \theta 1) \\ &= rkv \cdot V \cdot b1 \cdot \exp\{j \cdot (\theta 1 + \theta v)\}\end{aligned} \tag{33}$$

The equation (33) represents the difference between the electromotive forces at the end of the signal line 4b and the end of the signal line 4a, which are generated by the flow speed V of the fluid to be measured and the magnetic field B1. The sum of the electromotive forces at the end of the signal line 4b and the end of the signal line 4a is 0 in an ideal state where, for example, they are completely symmetrical.

An overall electromotive force difference Ed that is obtained by summing the electromotive force difference Ecd resulting from the change in the magnetic field B1 with passage of time; and the electromotive force difference Evc resulting from the flow speed V of the fluid to be measured and the magnetic field B1, is represented by the following equation using the equations (18) and (33):

$$\begin{aligned}Ed &= Ecd + Evc \\ &= rks \cdot \omega 0 \cdot b1 \cdot \exp\{j \cdot (\pi/2 + \theta 1 + \theta s)\} + \\ &\quad rkv \cdot V \cdot b1 \cdot \exp\{j \cdot (\theta 1 + \theta v)\}\end{aligned} \tag{34}$$

Further, an overall electromotive force sum that is obtained by summing the electromotive force sum resulting from the change in the magnetic field B1 with passage of time; and the electromotive force sum resulting from the flow speed V of the fluid to be measured and the magnetic field B1, is the same as the electromotive force sum Ecs (the equation (19)) resulting from the change in the magnetic field B1 with passage of time, since the electromotive force sum resulting from the flow speed V of the fluid to be measured and the magnetic field B1 is 0 as described above. In this manner, concerning first configuration, the inter-signal line electromotive force can be obtained.

Figure 12:
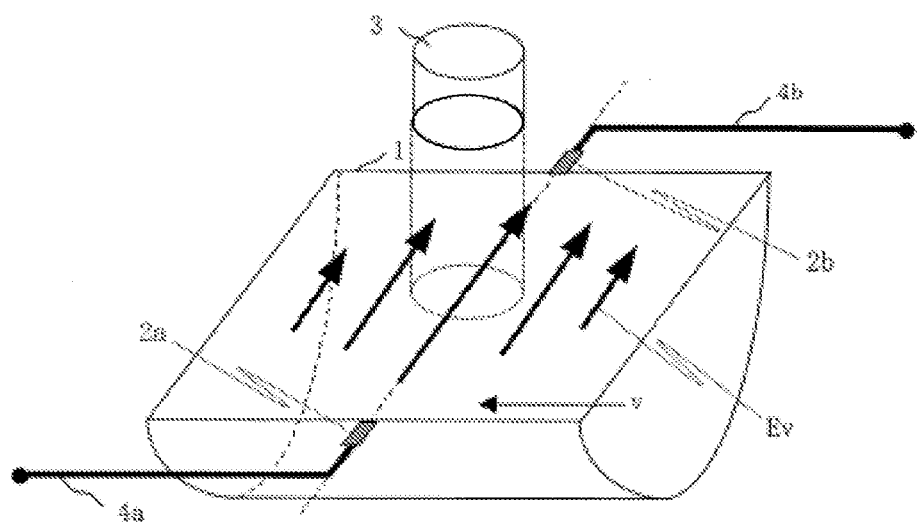
FIG. 12 is a diagram showing an inter-electrode electromotive force when the flow rate of the fluid to be measured is not 0 in the second configuration of the electromagnetic flowmeter of the present invention.

Description of an inter-signal line electromotive force in the second configuration will be given below. As shown in FIG. 12, an inter-electrode electromotive force Ev resulting from the flow speed V of the fluid to be measured and the magnetic field B1 is not affected by the arrangement of the signal lines, and thus the value of an inter-electrode electromotive force Evc obtained by rewriting the inter-electrode electromotive force Ev to a complex vector, is the same as that in the case of the first configuration.

An overall electromotive force difference EdR that is obtained by summing the electromotive force difference EcdR resulting from the change in the magnetic field B1 with passage of time; and the electromotive force difference Evc resulting from the flow speed V of the fluid to be measured and the magnetic field B1, is represented by the following equation using the equations (23) and (33):

$$\begin{aligned}EdR &= EcdR + Evc \\ &= rkd \cdot \omega 0 \cdot b1 \cdot \exp\{j \cdot (\pi/2 + \theta 1 + \theta d)\} + \\ &\quad rkv \cdot V \cdot b1 \cdot \exp\{j \cdot (\theta 1 + \theta v)\}\end{aligned} \tag{35}$$

Further, an overall electromotive force sum that is obtained by summing the electromotive force sum resulting from the change in the magnetic field B1 with passage of time; and the electromotive force sum resulting from the flow speed V of the fluid to be measured and the magnetic field B1, is the same as the electromotive force sum EcsR (the equation (24)) resulting from the change in the magnetic field B1 with passage of time, since the electromotive force sum resulting from the flow speed V of the fluid to be measured and the magnetic field B1 is 0 as described above. In this manner, concerning the second configuration, the inter-signal line force can be obtained.

Next, description of an inter-signal line electromotive force in the third configuration will be given below. The value of an inter-electrode electromotive force Evc obtained by rewriting the inter-electrode electromotive force Ev detected at the ends of the signal lines 4a and 4b to a complex vector, is the same as that in the case of the first configuration. An electromotive force difference that is obtained by summing the electromotive force difference Ecd1 between the end of the signal line 4b and the end of the signal line 4a, which results from the change in the magnetic field B1 with passage of time; and the electromotive force difference Evc resulting from the flow speed V of the fluid to be measured and the magnetic field B1, namely, an overall inter-signal line electromotive force difference E1d between the end of the signal line 4b and the end of the signal line 4a, is represented by the following equation using the equations (25) and (33):

$$E1d = Ecd1 + Evc \qquad (36)$$
$$= rks \cdot \omega 0 \cdot b1 \cdot \exp\{j \cdot (\pi/2 + \theta 1 + \theta s1)\} +$$
$$rkv \cdot V \cdot b1 \cdot \exp\{j \cdot (\theta 1 + \theta v)\}$$

Similarly, an electromotive force difference that is obtained by summing the electromotive force difference Ecd2 between the end of the signal line 4d and the end of the signal line 4c, which results from the change in the magnetic field B1 with passage of time; and the electromotive force difference Evc resulting from the flow speed V of the fluid to be measured and the magnetic field B1, namely, an overall electromotive force difference E2d between the end of the signal line 4d and the end of the signal line 4c, is represented by the following equation using the equations (26) and (33):

$$E2d = Ecd2 + Evc \qquad (37)$$
$$= -rks2 \cdot \omega 0 \cdot b1 \cdot \exp\{j \cdot (\pi/2 + \theta 1 + \theta s2)\} +$$
$$rkv \cdot V \cdot b1 \cdot \exp\{j \cdot (\theta 1 + \theta v)\}$$

In this manner, concerning the third configuration, the inter-signal line electromotive force can be obtained.

Basic Principle of Correction

Description of a basic principle for actually correcting a span will be given below.

Concepts of ∂A/∂T Component and V×B Component

As shown in FIGS. 2 to 4, when a magnetic field that is symmetrical with respect to the boundary in the measuring pipe 1, which is the plane PLN including the electrodes 2a and 2b, is applied to the fluid to be measured, a vector mapped on the complex plane corresponds to a resultant vector Va+Vb of a vector Va of a ∂A/∂t component and a vector Vb of a v×B component, on the basis of the amplitudes and the phase difference of electromotive forces detected as a result of this symmetrical excitation. The vector Va and the vector Vb are expressed as follows:

$$Va = r\alpha \cdot \exp(j \cdot \theta\alpha) \cdot C \cdot \omega \qquad (38)$$

$$Vb = r\beta \cdot \exp(j \cdot \theta\beta) \cdot C \cdot V \qquad (39)$$

Figure 13A:
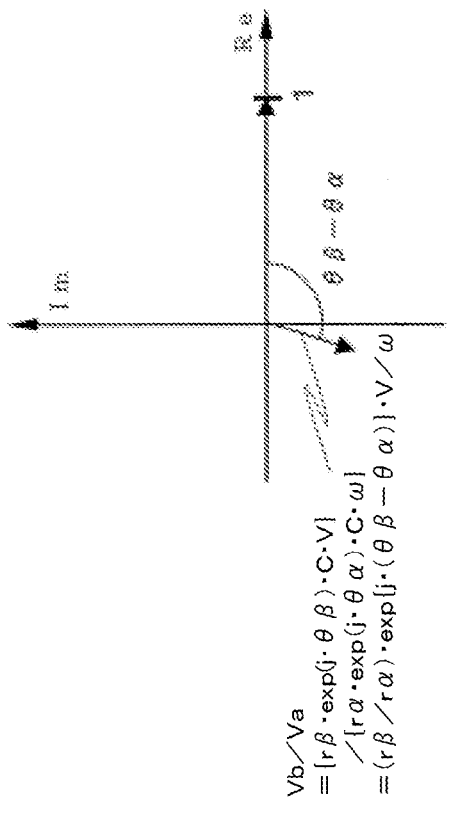
FIGS. 13A to 13C are graphs for illustrating a basic principle of span correction of the electromagnetic flowmeter of the present invention.

The vectors Va and Vb are shown in FIG. 13A. In FIG. 13A, "Re" is a real axis, and "Im" is an imaginary axis. The vector Va of the ∂A/∂t component is an electromotive force generated by a change in the magnetic field, so that the magnitude thereof is proportional to an exciting angular frequency ω. At this time, when a known proportionality constant part with respect to the magnitude of the vector Va is indicated by "rα" and the direction of the vector Va is indicated by "θα", "C" is given as a variation factor such as a shift of the magnetic field, namely, as a span-variation factor. In addition, since the vector Vb of the v×B component is an electromotive force generated by movement of the fluid to be measured in the measuring pipe, the magnitude thereof is proportional to the magnitude V of the flow speed. At this time, when a known proportionality constant part with respect to the magnitude of the vector Vb is indicated by "rβ" and the direction of the vector Vb is indicated by "θβ", "C" is given as a span-variation factor. Note that "C" in the vector Va of the ∂A/∂t component in the equation (38), and "C" in the vector Vb of the v×B component in the equation (39), are the same as each other.

Concept of Span Correction

The reason for span change such as a shift is a change in the span-variation factor C. Thus, when the magnitude V of the flow speed of the fluid to be measured is obtained by using a signal conversion equation in which the span-variation factor C is eliminated, automatic span correction can be substantially realized. Specific methods for span correction include the following two methods.

In a first correction method, automatic span correction is achieved in flow rate measurement, by normalizing the vector Vb of the v×B component by the vector Va of the ∂A/∂t component to eliminate the span-variation factor C, and by using a signal conversion equation concerning the magnitude V of the flow speed based on the normalized vector. The normalization in the first correction method is represented by the following mathematical expression:

$$Vb/Va = \{r\beta \cdot \exp(j \cdot \theta\beta) \cdot C \cdot V\} / \{r\alpha \cdot \exp(j \cdot \theta\alpha) \cdot C \cdot \omega\} \qquad (40)$$
$$= (r\beta/r\alpha) \cdot \exp(j \cdot (\theta\beta - \theta\alpha)) \cdot V/\omega$$

$$\therefore |Vb/Va| = (r\beta/r\alpha) \cdot V/\omega \qquad (41)$$

Figure 13B:
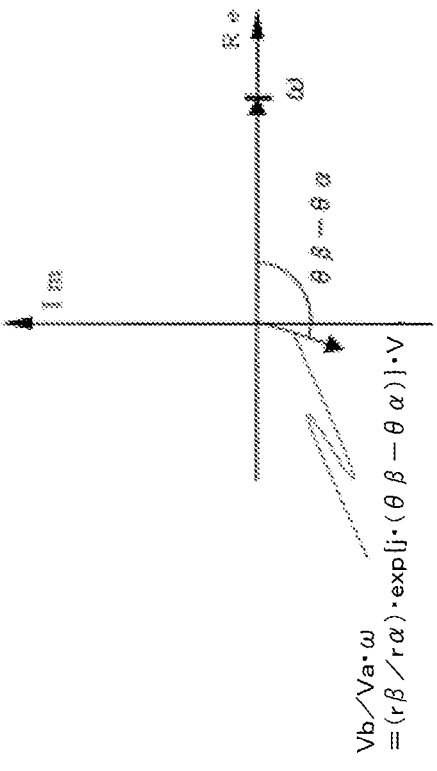
Figure 13C:
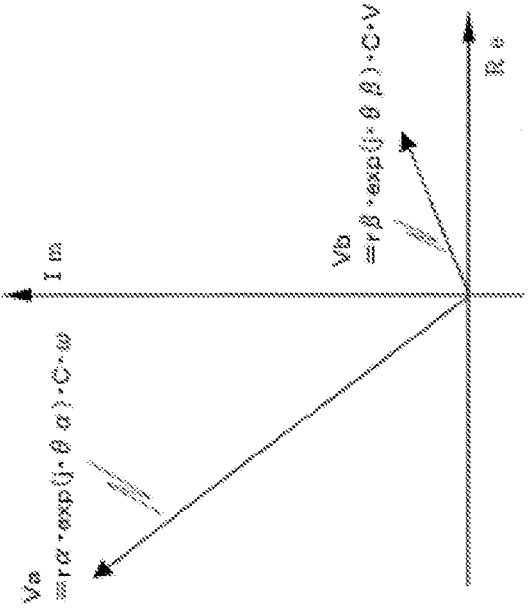

A vector obtained by normalizing the vector Vb of the v×B component by the vector Va of the ∂A/∂t component, is shown in FIG. 13B. Note that a vector in FIG. 13C is a vector obtained by multiplying the vector in FIG. 13B by the exciting angular frequency ω to eliminate the exciting angular frequency ω from the right-hand side of the equation (40).

In a second correction method, automatic span correction is achieved in flow rate measurement, by normalizing the resultant vector Va+Vb by the vector Va of the ∂A/∂t component to eliminate the span-variation factor C, and by using a signal conversion equation concerning the magnitude V of the flow speed based on the normalized vector. The normalization in the second correction method is represented by the following mathematical expression:

$$(Va+Vb)/Va = \{r\alpha \cdot \exp(j \cdot \theta\alpha) \cdot C \cdot \omega + r\beta \cdot \exp(j \cdot \theta\beta) \cdot C \cdot V\}/ \qquad (42)$$
$$\{r\alpha \cdot \exp(j \cdot \theta\alpha) \cdot C \cdot \omega\}$$
$$= 1 + (r\beta/r\alpha) \cdot \exp(j \cdot (\theta\beta - \theta\alpha)) \cdot V/\omega$$

$$\therefore |(Va+Vb)/Va - 1| = (r\beta/r\alpha) \cdot V/\omega \qquad (43)$$

Extraction of Vector VA of ∂A/∂T Component

Methods for extracting the vector Va of the ∂A/∂t component include three methods set forth below. In a first extraction method, the vector Va is extracted on the basis of phase difference of detected signals. A complex vector that can be obtained directly from the inter-signal line electromotive force, is the resultant vector of the vectors Va and Vb, and the vectors Va and Vb cannot be directly measured. Thus, attention is paid to the fact that, when the applied magnetic field is used as a reference, the phase difference of the ∂A/∂t component from the reference and the phase difference of the v×B component from the reference are substantially constant. Specifically, when the phase of exciting current is measured and used as a reference, the vector Va has a known phase difference. Thus, the vector Va can be extracted by extracting a component having the phase difference, from the resultant vector Va+Vb.

In a second extraction method, the vector Va is extracted by applying, to the fluid to be measured, a magnetic field based on a plurality of exciting frequencies, in order to use frequency difference(s) of a plurality of components included in an inter-signal line electromotive force. As described above, a complex vector that can be obtained directly from the inter-signal line electromotive force, is the resultant vector of the vectors Va and Vb, and the vectors Va and Vb cannot be directly measured. Thus, attention is paid to the fact that the magnitude of the vector Va of the ∂A/∂t component is proportional to the exciting angular frequency ω and the vector Vb of the v×B component is not dependent on the exciting angular frequency ω. Specifically, exciting current including two components that have the same magnitude and different frequencies, is applied to the exciting coil. When excitation is achieved by using current having two frequency components, a resultant vector Va+Vb that is solved on the basis of each frequency component, is obtained. The difference between the resultant vector Va+Vb of a first frequency component and the resultant vector Va+Vb of a second frequency component is a vector that gives only an amount of a change in the magnitude of the vector Va of the ∂A/∂t component. Thus, the vector Va of the ∂A/∂t component can be extracted.

In a third extraction method, the vector Va is extracted by using the difference between electromotive forces in a plurality of signal lines. The third extraction method is effective when a plurality of signal lines that extend along different paths are provided. As described above, a complex vector that can be obtained directly from the inter-signal line electromotive force, is the resultant vector of the vectors Va and Vb, and the vectors Va and Vb cannot be directly measured. Thus, the fact is used, in which a v×B component detected at an end of a signal line does not relates to the arrangement of the signal lines but the direction and the magnitude of a ∂A/∂t component changes depending on the arrangement of the signal lines.

Specifically, one electrode is used, wherein two signal lines are connected to the electrode and arranged so as to be symmetrical with respect to a plane PLN including the electrode. This configuration corresponds to the case where only the electrode 2a and the signal lines 4a and 4c are used in FIG. 4. When the difference between the electromotive forces in the signal lines 4a and 4c is obtained, the v×B component is cancelled, so that the ∂A/∂t component can be extracted.

Alternatively, two electrodes may be used, wherein two signal lines may be connected to each electrode and arranged so as to be symmetrical with respect to a plane PLN including the electrodes. This configuration corresponds to the configuration shown in FIG. 4. When the difference between a first inter-signal line electromotive force difference that is the electromotive force difference between the signal lines 4a and 4b; and a second inter-signal line electromotive force difference that is the electromotive force difference between the signal lines 4c and 4d, are obtained, the v×B component is cancelled, so that the ∂A/∂t component can be extracted.

Alternatively, two electrodes may be used, wherein a signal line is connected to each electrode, and the two signal lines are arranged so as to be substantially rotationally symmetrical with respect to the axis of the exciting coil. This configuration corresponds to the configuration in FIG. 3. When the signal lines 4a and 4b are located as shown in FIG. 3, if a resultant vector of the sum of the electromotive forces in the signal lines 4a and 4b is obtained, the v×B component is cancelled, so that a component that is double the ∂A/∂t component generated in each signal line, can be extracted as the vector Va.

Calculation of Span-Corrected Flow Speed (Flow Rate)

When a result obtained by performing normalization by the above first correction method in which the vector Vb of the v×B component is normalized by the vector Va of the ∂A/∂t component, is used, the magnitude V of the flow speed of the fluid to be measured can be calculated as follows:

$$V=(r\alpha/r\beta)|Vb/Va|\cdot\omega \qquad (44)$$

Further, when a result obtained by performing normalization by the above second correction method in which the resultant vector Va+Vb is normalized by the vector Va of the ∂A/∂t component, is used, the magnitude V of the flow speed of the fluid to be measured can be calculated as follows:

$$V=(r\alpha/r\beta)\{|(Va+Vb)/Va-1|\}\cdot\omega \qquad (45)$$

Since with the above principle, the magnitude V of the flow speed can be measured independently of the span-variation factor C such as a shift of the magnetic field, automatic span correction is substantially achieved.

The description of the sum of two vectors on the complex plane will be supplemented. The sum of the two vectors on the complex plane is represented by the following equation:

$$\begin{aligned} A\cdot\exp(j\cdot a)+B\cdot\exp(j\cdot b) &= A\cdot\cos(a)+j\cdot A\cdot\sin(a)+ \\ &\quad B\cdot\cos(b)+j\cdot B\cdot\sin(b) \\ &= \{A\cdot\cos(a)+B\cdot\cos(b)\}+ \\ &\quad j\cdot\{A\cdot\sin(a)+B\cdot\sin(b)\} \end{aligned} \qquad (46)$$

The equation (46) is expressed as Cs·exp(j·cs). The magnitude Cs is represented by the following equation:

$$\begin{aligned} Cs &= sqrt[\{A\cdot\cos(a)+B\cdot\cos(b)\}^2+\{A\cdot\sin(a)+B\cdot\sin(b)\}^2] \\ &= sqrt[\{A^2\cdot\cos^2(a)+B^2\cdot\cos^2(b)+2\cdot A\cdot B\cdot\cos(a)\cdot\cos(b)+ \\ &\quad A^2\cdot\sin^2(a)+B^2\cdot\sin^2(b)+2\cdot A\cdot B\cdot\sin(a)\cdot\sin(b)] \\ &= sqrt[A^2+B^2+2\cdot A\cdot B\cdot\{\cos(a)\cdot\cos(b)+\sin(a)\cdot\sin(b)\}] \\ &= sqrt\{A^2+B^2+A\cdot B\cdot\cos(a-b)\} \end{aligned} \qquad (47)$$

Further, the phase cs at this time can be represented by the following equation:

$$cs=\tan^{-1}[\{A\cdot\sin(a)+B\cdot\sin(b)\}/\{A\cdot\cos(a)+B\cdot\cos(b)\}] \qquad (48)$$

The description of the difference between the two vectors on the complex plane will be supplemented. The difference between the two vectors on the complex plane is represented by the following equation:

$$\begin{aligned} B\cdot\exp(j\cdot b)-A\cdot\exp(j\cdot a) &= B\cdot\cos(b)+j\cdot B\cdot\sin(b)- \\ &\quad A\cdot\cos(a)-j\cdot A\cdot\sin(a) \\ &= \{B\cdot\cos(b)-A\cdot\cos(a)\}+ \\ &\quad j\cdot\{B\cdot\sin(b)-A\cdot\sin(a)\} \end{aligned} \qquad (49)$$

The equation (49) is expressed as $Cd \cdot \exp(j \cdot cd)$. The magnitude Cd is represented by the following equation:

$$Cd = sqrt[\{B \cdot \cos(b) - A \cdot \cos(a)\}^2 + \{B \cdot \sin(b) - A \cdot \sin(a)\}^2] \quad (50)$$
$$= sqrt[B^2 \cdot \cos^2(b) + A^2 \cdot \cos^2(a) - 2 \cdot B \cdot A \cdot \cos(b) \cdot \cos(a) +$$
$$B^2 \cdot \sin^2(b) + A^2 \cdot \sin^2(a) - 2 \cdot B \cdot A \cdot \sin(b) \cdot \sin(a)]$$
$$= sqrt[B^2 + A^2 - 2 \cdot B \cdot A \cdot \{\cos(b) \cdot \cos(a) + \sin(b) \cdot \sin(a)\}]$$
$$= sqrt\{B^2 + A^2 - B \cdot A \cdot \cos(b - a)\}$$

Further, the phase cs at this time can be represented by the following equation:

$$cs = \tan^{-1}[\{B \cdot \sin(b) - A \cdot \sin(a)\}/\{B \cdot \cos(b) - A \cdot \cos(a)\}] \quad (51)$$

First Embodiment

Detail description of a first embodiment of the present invention will be given below referring to drawings. In the present embodiment, the first configuration described in the above principle is used, the first extraction method is used as a method for extracting the vector Va of the ∂A/∂t component, and further the second correction method is used as a method for span correction.

Figure 14:
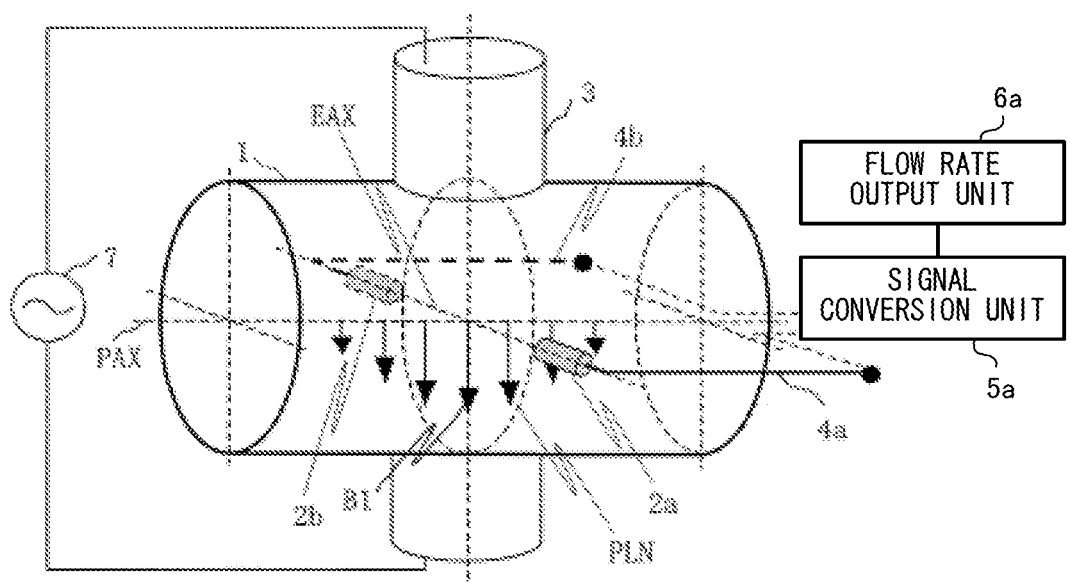
FIG. 14 is a block diagram showing a configuration of an electromagnetic flowmeter according to a first embodiment of the present invention.

FIG. 14 is a block diagram showing a configuration of an electromagnetic flowmeter according to the first embodiment of the present invention. The electromagnetic flowmeter of the present embodiment includes a measuring pipe 1 through which fluid to be measured flows; a pair of electrodes 2a and 2b that are arranged in the measuring pipe 1 so as to face each other, so as to be perpendicular to both a magnetic field applied to the fluid to be measured and a measuring pipe axis PAX, and so as to be in contact with the fluid to be measured and detect an electromotive force generated by the magnetic field and the flow of the fluid to be measured; an exciting coil 3 that, when a plane PLN including the electrodes 2a and 2b is regarded as a boundary in the measuring pipe 1, applies to the fluid to be measured a time-changing magnetic field that is symmetrical with respect to the boundary in the measuring pipe 1; signal lines 4a and 4b that are connected to the electrodes 2a and 2b at one ends thereof and provided so as to be inclined with respect to a direction of a magnetic field parallel to the plane PLN so that an electromotive force is generated by a change in the magnetic field with passage of time; a signal conversion unit 5a that is connected to other ends of the signal lines 4a and 4b and extracts a ∂A/∂t component from an electromotive force that is obtained from the signal lines 4a and 4b; a flow rate output unit 6a that eliminates, on the basis of the extracted ∂A/∂t component, a variation factor as to a span that is a coefficient applied to the magnitude V of the flow speed of a v×B component in the electromotive force, and calculates the flow rate of the fluid to be measured on the basis of the result in which the variation factor is eliminated; and a power supply 7 that supplies exciting current to the exciting coil 3 to generate a magnetic field.

In FIG. 14, of a magnetic field generated from the exciting coil 3 as a result of the exciting current being supplied from the power supply 7, a magnetic field component (magnetic flux density) B1 that is perpendicular to both an electrode axis EAX connecting the electrodes 2a and 2b and the measuring pipe axis PAX on the electrode axis EAX, and exciting current I1 at this time, are given as follows:

$$B1 = b1 \cdot \cos(\omega 0 \cdot t - \theta 1) \quad (52)$$

$$I1 = i1 \cdot \cos(\omega 0 \cdot t - \theta i1) \quad (53)$$

In the equation (52), "b1" indicates the amplitude of the magnetic flux density B1; "ω0" indicates an angular frequency; and "θ1" indicates the phase difference (phase lag) between the magnetic flux density B1 and ω0·t. Hereinafter, the magnetic flux density B1 is referred to as magnetic field B1. In addition, in the equation (53), "i1" indicates the amplitude of the exciting current I1, and "θi1" indicates the phase difference between the exciting current I1 and ω0·t. At this time, the relation between the exciting current I and the generated magnetic field B is represented by the following equation:

$$B = ki \cdot I \quad (54)$$

In the equation (54), "ki" indicates a complex number that depends on loss due to a magnetic member and a pipe, and "ki" is represented as a complex vector: by the following equation:

$$ki = rki \cdot \cos(\theta i) + j \cdot rki \cdot \sin(\theta i) \quad (55)$$
$$= rki \cdot \exp(j \cdot \theta i)$$

In the equation (55), "rki" indicates a proportional coefficient, and "θi" indicates the angle of the vector ki with respect to the real axis.

When the magnetic field B1 shown in the equation (52) is rewritten to a complex vector by using the equations (53) to (55), the complex vector is represented as "B1c" by the following equation:

$$B1c = rki \cdot i1 \cdot \exp\{j \cdot (\theta i + \theta i1)\} \quad (56)$$

The relations of the following equations are satisfied by the equations (52) and (56):

$$b1 = rki \cdot i1 \quad (57)$$

$$\theta 1 = \theta i + \theta i1 \quad (58)$$

An inter-signal line electromotive force difference is difference between an electromotive force detected at an end of the signal line 4b on the signal conversion unit side and an electromotive force detected at an end of the signal line 4a on the signal conversion unit side. Of an overall inter-signal line electromotive force difference that is obtained by summing an electromotive force difference obtained by rewriting, to a complex vector, an inter-signal line electromotive force difference resulting from a change in the magnetic field B1 with passage of time and an electromotive force difference obtained by rewriting, to a complex vector, an inter-signal line electromotive force difference resulting from the flow speed V of the fluid to be measured and the magnetic field B1, an inter-signal line electromotive force difference of a component of an angular frequency ω0 is defined as "Ei0". In this case, the inter-signal line electromotive force difference Ei0 is represented by the following equation, when the equations (57) and (58) are substituted into the equation (34) and further substitution is made as rkv=γv·rks:

$$Ei0 = rks \cdot \omega 0 rki \cdot i1 \cdot \exp\{j \cdot (\pi/2 + \theta i + \theta i1 + \theta s)\} + \gamma v \cdot rks \cdot V \cdot rki \cdot i1 \cdot \exp\{j \cdot (\theta i + \theta i1 + \theta v)\} \quad (59)$$

The inter-signal line electromotive force difference Ei0 shown in the equation (59) is a signal detected by the signal conversion unit 5a. "θi1" indicates the measurable phase of the exciting current I1, and θi, θs, and θv can be constants that can be measured at calibration. Thus, the inter-signal line electromotive force difference Ei0 can be broken down into a direction of (π/2+θi+θi1+θs) and a direction of (θi+θi1+θv), and rks·ω0·rki·i1·exp{j·(π/2+θi+θi1+θs)} that is a ∂A/∂t component can be extracted. When the electromotive force that is the ∂A/∂t component is indicated by "EiA", the electromotive force EiA is represented by the following equation:

$$EiA = rks \cdot \omega 0 \cdot rki \cdot i1 \cdot \exp\{j \cdot (\pi/2 + \theta i + \theta i1 + \theta s)\} \quad (60)$$

A v×B component in the inter-signal line electromotive force difference Ei0 is normalized by using the electromotive force EiA shown in the equation (60). When a result obtained by normalizing the inter-signal line electromotive force difference Ei0 by the electromotive force EiA and performing multiplication by ω0, is indicated by "Ein", the normalized electromotive force difference Ein is represented by the following equation:

$$\begin{aligned} Ein &= (Ei0/EiA) \cdot \omega 0 \\ &= [rks \cdot \omega 0 \cdot rki \cdot i1 \cdot \exp\{j \cdot (\pi/2 + \theta i + \theta i1 + \theta s)\} + \\ &\quad \gamma v \cdot rks \cdot V \cdot rki \cdot i1 \cdot \exp\{j \cdot (\theta i + \theta i1 + \theta v)\}]/ \\ &\quad [rks \cdot \omega 0 \cdot rki \cdot i1 \cdot \exp\{j \cdot (\pi/2 + \theta i + \theta i1 + \theta s)\}] \cdot \omega 0 \\ &= \omega 0 + [\gamma v \cdot \exp\{j \cdot (-\pi/2 - \theta s + \theta v)\}] \cdot V \end{aligned} \quad (61)$$

The second term on the right-hand side of the equation (61) is a term obtained by normalizing the component generated by v×B. Note that the reason why the result obtained by normalizing the inter-signal line electromotive force difference Ei0 by the electromotive force EiA is multiplied by ω0, is for eliminating the exciting angular frequency ω0 from the second term on the right-hand side concerning the magnitude V of the flow speed. According to the equation (61), the complex coefficient applied to the magnitude V of the flow speed has a magnitude of γv and a phase difference of −π/2−θs+θv from the real axis. The coefficient γv and the angles θs and θv are constants that can be obtained in advance by calibration or the like, and thus the second term on the right-hand side of the equation (61) is maintained constant unless the flow speed of the fluid to be measured changes. Therefore, by normalizing the v×B component using the ∂A/∂t component, it is possible to realize span correction, which automatically corrects an error caused by a shift of the magnetic field and/or a phase change due to a change in the exciting current.

Using the equation (61), the magnitude V of the flow speed is represented by the following equation:

$$\begin{aligned} V &= |(Ein - \omega 0)/[\gamma v \cdot \exp\{j \cdot (-\pi/2 - \theta s + \theta v)\}]| \\ &= |(Ein - \omega 0)|/\gamma v \end{aligned} \quad (62)$$

Note that the correspondence relation between: the constants and the variables used in the above basic principle, and the constants and the variables used in the present embodiment is shown in Table 1 set forth below. The coefficient γv and the angles θi, θs, and θv are constants that can be obtained in advance by calibration or the like. As is clear from Table 1, the present embodiment is one of examples that concretely implements the above basic principle.

TABLE 1

Correspondence Relation Between Basic Principle And First Embodiment

| Constants and Variables in Basic Principle | Constants and Variables in First Embodiment |
| --- | --- |
| rα | 1 |
| rβ | γv |
| θα | π/2 + θi + θs |
| θβ | θi + θv |
| C | rks · rki · i1 · exp(j · θi1) |

Figure 15:
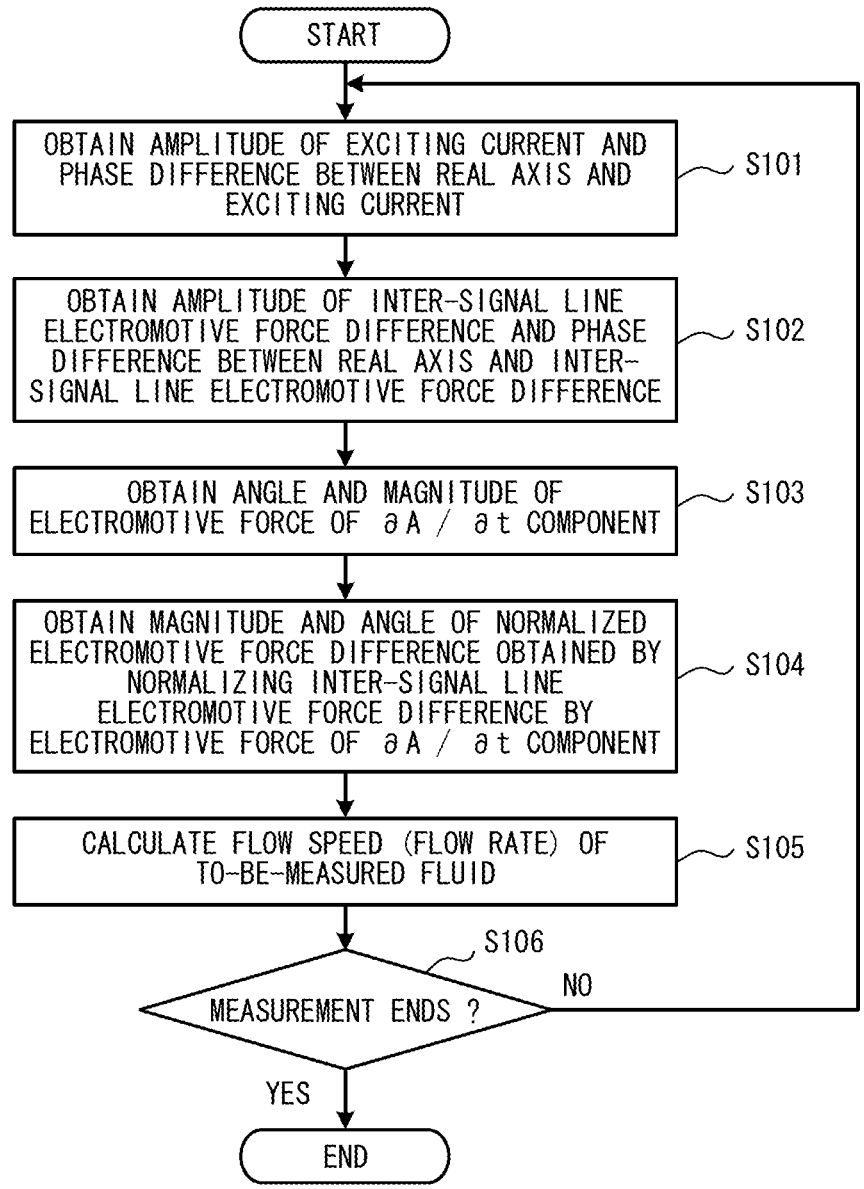
FIG. 15 is a flowchart showing an operation of a signal conversion unit and a flow rate output unit in the first embodiment of the present invention.

Next, description of a specific operation of the electromagnetic flowmeter of the present embodiment will be given below. The power supply 7 supplies, to the exciting coil 3, exciting current I1 having a sine wave component of the angular frequency ω0. FIG. 15 is a flowchart showing an operation of the signal conversion unit 5a and the flow rate output unit 6a. First, the signal conversion unit 5a obtains an amplitude it of the component of the angular frequency ω0 in the exciting current I1 and also obtains a phase difference Oi1 between the real axis and the component of the angular frequency w0 in the exciting current I1 by using a phase detector (not shown) (step S101 in FIG. 15).

Further, the signal conversion unit 5a obtains an amplitude r0 of the inter-signal line electromotive force difference Ei0 that is a component of the angular frequency ω0 in the inter-signal line electromotive force difference, and also obtains a phase difference φ0 between the real axis and the inter-signal line electromotive force difference Ei0 by using the phase detector (step S102).

Next, the signal conversion unit 5a obtains an angle and a magnitude of the electromotive force EiA that is a ∂A/∂t component in the inter-signal line electromotive force difference Ei0 (step S103). The process at step S103 corresponds to the process of obtaining a ∂A/∂t component and a v×B component, and corresponds to the process of calculation of the equation (60). The signal conversion unit 5a calculates an angle ∠EiA of the electromotive force EiA with respect to the real axis on the basis of the following equation:

$$\angle EiA = \pi/2 + \theta i + \theta i1 + \theta s \quad (63)$$

Further, the signal conversion unit 5a calculates a magnitude |EiA| of the electromotive force EiA on the basis of the following equation:

$$|EiA| = r0 \cdot \sin(\phi 0 - \theta i - \theta i1 - \theta v)/\sin(\pi/2 - \theta s + \theta v) \quad (64)$$

The process at step S103 ends therewith.

Next, the flow rate output unit 6a obtains a magnitude and an angle of the normalized electromotive force difference Ein that is obtained by normalizing the inter-signal line electromotive force difference Ei0 by the electromotive force EiA (step S104). The process at step S104 corresponds to the process of calculation of the equation (61). The flow rate output unit 6a calculates a magnitude |Ein| of the normalized electromotive force difference Ein on the basis of the following equation:

$$|Ein| = (r0/|EiA|) \cdot \omega 0 \quad (65)$$

Further, the flow rate output unit 6a calculates an angle ∠Ein of the normalized electromotive force difference Ein on the basis of the following equation:

$$\angle Ein = \phi 0 - \angle EiA \quad (66)$$

The process at step S104 ends therewith.

Subsequently, the flow rate output unit 6a calculates a magnitude V of the flow speed of the fluid to be measured (step S105). The process at step S105 corresponds to the process of calculation of the equation (62). The flow rate output unit 6a calculates a real axis component A of (Ein−ω0) and an imaginary axis component B of (Ein−ω0) on the basis of the following equations:

$$A=|Ein|\cos(\angle Ein)-\omega 0 \qquad (67)$$

$$B=|Ein|\sin(\angle Ein) \qquad (68)$$

Then, the flow rate output unit 6a calculates the magnitude V of the flow speed of the fluid to be measured on the basis of the following equation:

$$V=(A^2+B^2)^{1/2}/\gamma v \qquad (69)$$

The process at step S105 ends therewith.

The signal conversion unit 5a and the flow rate output unit 6a perform the above processes at steps S101 to S105 every constant time period, for example, until an instruction to end the measurement is made by an operator (YES at step S106).

As described above, in the present embodiment, the electromotive force EiA (the vector Va in the ∂A/∂t component) is extracted from the inter-signal line electromotive force difference Ei0 (the resultant vector Va+Vb), and the span applied to the magnitude V of the flow speed of the v×B component in the inter-signal line electromotive force difference Ei0, is normalized by using the electromotive force EiA, to eliminate the span-variation factor. Thus, accurate span correction can be automatically performed, and flow rate measurement can be performed with high accuracy. In the present embodiment, when the measuring pipe 1, the electrodes 2a and 2b, and the exciting coil 3, which are components of a detector of a conventional general-form electromagnetic flowmeter, are used, and the signal lines 4a and 4b are provided such that an electromotive force is generated by a change in the magnetic field with passage of time, accurate span correction can be automatically performed. Therefore, the effect that can be obtained only in an asymmetrical excitation electromagnetic flowmeter, can be achieved in a general-form electromagnetic flowmeter without greatly changing the configuration of a detector thereof.

Second Embodiment

Description of a second embodiment of the present invention will be given below. In the present embodiment, the first configuration described in the above principle is used, the second extraction method is used as a method for extracting the vector Va of the ∂A/∂t component, and the second correction method is used as a method for span correction. In the present embodiment, the configuration of an electromagnetic flowmeter is the same as that in the first embodiment, so that description thereof will be given by using the reference characters in FIG. 14

In FIG. 14, of a magnetic field generated from the exciting coil 3, a magnetic field component (magnetic flux density) B1 that is perpendicular to both the electrode axis EAX connecting the electrodes 2a and 2b and the measuring pipe axis PAX on the electrode axis EAX, is given as follows:

$$B1=b1\cdot\cos(\omega 0\cdot t-\theta 1)+b1\cdot\cos(\omega 1\cdot t-\theta 1) \qquad (70)$$

In the equation (70), "b1" indicates the amplitude of the magnetic flux density B1; ω0 and ω1 indicate angular frequencies; "θ1" indicates the phase difference (phase lag) between the magnetic flux density B1 and ω0·t or ω1·t. Hereinafter, the magnetic flux density B1 is referred to as magnetic field B1. Similarly to the first embodiment, an inter-signal line electromotive force difference is the difference between an electromotive force detected at the end of the signal line 4b on the signal conversion unit side; and an electromotive force detected at the end of the signal line 4a on the signal conversion unit side. Of an overall inter-signal line electromotive force difference obtained by summing an electromotive force difference obtained by rewriting, to a complex vector, an inter-signal line electromotive force difference resulting from a change in the magnetic field B1 with passage of time; and an electromotive force difference obtained by rewriting, to a complex vector, an inter-signal line electromotive force difference resulting from the flow speed V of the fluid to be measured and the magnetic field B1, an inter-signal line electromotive force difference of a component of an angular frequency ω0 is indicated by "Ed0". In this case, the inter-signal line electromotive force difference Ed0 is represented by equation (71) corresponding to the equation (34).

$$Ed0=rks\cdot\omega 0\cdot b1\cdot\exp\{j\cdot(\pi/2+\theta 1+\theta s)\}+rkv\cdot V\cdot b1\cdot\exp\{j\cdot(\theta 1+\theta v)\} \qquad (71)$$

Further, of the overall inter-signal line electromotive force difference obtained by summing the electromotive force difference obtained by rewriting, to the complex vector, the inter-signal line electromotive force difference resulting from the change in the magnetic field B1 with passage of time; and the electromotive force difference obtained by rewriting, to the complex vector, the inter-signal line electromotive force difference resulting from the flow speed V of the fluid to be measured and the magnetic field B1, an inter-signal line electromotive force difference of a component of an angular frequency col is indicated by "Ed1". In this case, the inter-signal line electromotive force difference Ed1 is represented by equation (72) corresponding to the equation (34).

$$Ed1=rks\cdot\omega 1\cdot b1\cdot\exp\{j\cdot(\pi/2+\theta 1+\theta s)\}+rkv\cdot V\cdot b1\cdot\exp\{j\cdot(\theta 1+\theta v)\} \qquad (72)$$

Here, when it is assumed that θv=θs+Δθv and rkv=γv·rks, and they are substituted into the equations (71) and (72), the inter-signal line electromotive force differences Ed0 and Ed1 are represented by equations (73) and (74), respectively.

$$\begin{aligned}Ed0 &= rks\cdot\omega 0\cdot b1\cdot\exp\{j\cdot(\pi/2+\theta 1+\theta s)\} + \\ &\quad \gamma v\cdot rks\cdot V\cdot b1\cdot\exp\{j\cdot(\theta 1+\theta s+\Delta\theta v)\} \\ &= rks\cdot b1\cdot\exp\{j\cdot(\theta 1+\theta s)\}\cdot \\ &\quad \{\omega 0\cdot\exp(j\cdot\pi/2)+\gamma v\cdot V\cdot\exp(j\cdot\Delta\theta v)\}\end{aligned} \qquad (73)$$

$$\begin{aligned}Ed1 &= rks\cdot\omega 1\cdot b1\cdot\exp\{j\cdot(\pi/2+\theta 1+\theta s)\} + \\ &\quad \gamma v\cdot rks\cdot V\cdot b1\cdot\exp\{j\cdot(\theta 1+\theta s+\Delta\theta v)\} \\ &= rks\cdot b1\cdot\exp\{j\cdot(\theta 1+\theta s)\}\cdot \\ &\quad \{\omega 1\cdot\exp(j\cdot\pi/2)+\gamma v\cdot V\cdot\exp(j\cdot\Delta\theta v)\}\end{aligned} \qquad (74)$$

When the difference between the inter-signal line electromotive force differences Ed0 and Ed1 is obtained and the result obtained by multiplying the obtained difference by ω0/(ω0−ω1) is indicated by "EdA", the following equation is satisfied:

$$\begin{aligned}EdA &= (Ed0 - Ed1)\cdot\omega 0/(\omega 0-\omega 1) \\ &= rks\cdot b1\cdot\exp\{j\cdot(\theta 1+\theta s)\}\cdot \\ &\quad \{\omega 0\cdot\exp(j\cdot\pi/2)+\gamma v\cdot V\cdot\exp(j\cdot\Delta\theta v)- \\ &\quad \omega 1\cdot\exp(j\cdot\pi/2)-\gamma v\cdot V\cdot\exp(j\cdot\Delta\theta v)\}\cdot\omega 0/(\omega 0-\omega 1) \\ &= rks\cdot\omega 0\cdot b1\cdot\exp\{j\cdot(\pi/2+\theta 1+\theta s)\}\end{aligned} \qquad (75)$$

The electromotive force difference EdA is unrelated to the magnitude V of the flow speed, and thus includes only the component generated by ∂A/∂t. By using the electromotive force difference EdA, a coefficient (span) applied to the magnitude V of the flow speed of the v×B component in the inter-signal line electromotive force difference Ed0 (the resultant vector Va+Vb) is normalized. Note that, to be exact, the electromotive force difference EdA is the value obtained by multiplying the electromotive force difference between the inter-signal line electromotive force differences Ed0 and Ed1 by ω0/(ω0−ω1), and the reason for multiplication by ω0/(ω0−ω1) is for facilitating development of the equation.

When the result obtained by normalizing the inter-signal line electromotive force difference Ed0 shown in the equation (73) by the electromotive force difference EdA shown in the equation (75), and performing multiplication by ω0, is indicated by "Ean", the normalized electromotive force difference Ean is represented by the following equation:

$$Ean = (Ed0/EdA) \cdot \omega 0 \quad (76)$$

$$= rks \cdot b1 \cdot \exp\{j \cdot (\theta 1 + \theta s)\} \cdot$$

$$\{\omega 0 \cdot \exp(j \cdot \pi/2) + \gamma v \cdot V \cdot \exp(j \cdot \Delta\theta v)\}/$$

$$rks \cdot \omega 0 \cdot b1 \cdot \exp\{j \cdot (\pi/2 + \theta 1 + \theta s)\} \cdot \omega 0$$

$$= \omega 0 + [\gamma v \cdot \exp\{j \cdot (-\pi/2 + \Delta\theta v)\}] \cdot V$$

The second term on the right-hand side of the equation (76) is a term obtained by normalizing the component generated by v×B, by the component generated by ∂A/∂t. Note that the reason why the result obtained by normalizing the inter-signal line electromotive force difference Ed0 by the electromotive force difference EdA is multiplied by ω0 is for eliminating the exciting angular frequency ω0 from the second term on the right-hand side concerning the magnitude V of the flow speed. According to the equation (76), the complex coefficient applied to the magnitude V of the flow speed has a magnitude of γv and a phase difference of −π/2+Δθv from the real axis. The coefficient γv and the angle Δθv are constants that can be obtained in advance by calibration or the like, and the second term on the right-hand side of the equation (76) is maintained constant unless the flow speed of the fluid to be measured changes.

Therefore, by normalizing the v×B component by using the ∂A/∂t component, span correction can be achieved, which automatically corrects an error caused by a shift of the magnetic field and/or a phase change. Using the equation (76), the magnitude V of the flow speed is represented by the following equation:

$$V = |(Ean - \omega 0)/[\gamma v \cdot \exp\{j \cdot (-\pi/2 + \Delta\theta v)\}]| \quad (77)$$

$$= |(Ean - \omega 0)|/\gamma v$$

Note that the correspondence relation between the constants and the variables used in the above basic principle; and the constants and the variables used in the present embodiment is shown in Table 2 set forth below. The coefficient γv and the angle Δθv are constants that can be obtained in advance by calibration or the like. As is clear from Table 2, the present embodiment is one of examples that concretely implements the above basic principle.

TABLE 2

Correspondence Relation between Basic Principle and Second Embodiment

| Constants and Variables in Basic Principle | Constants and Variables in Second Embodiment |
|---|---|
| rα | 1 |
| rβ | γv |
| θα | π/2 |
| θβ | Δθv |
| C | $rks \cdot b1 \cdot \exp\{j \cdot (\theta 1 + \theta s)\}$ |

Description of a specific operation of the electromagnetic flowmeter of the present embodiment will be given below. The power supply 7 supplies, to the exciting coil 3, exciting current that includes a sine wave component of a first angular frequency ω0 and a sine wave component of a second angular frequency ω1. At this time, the amplitude of the component of the angular frequency ω0 and the amplitude of the component of the angular frequency ω1 in the exciting current, are the same as each other.

Figure 16:
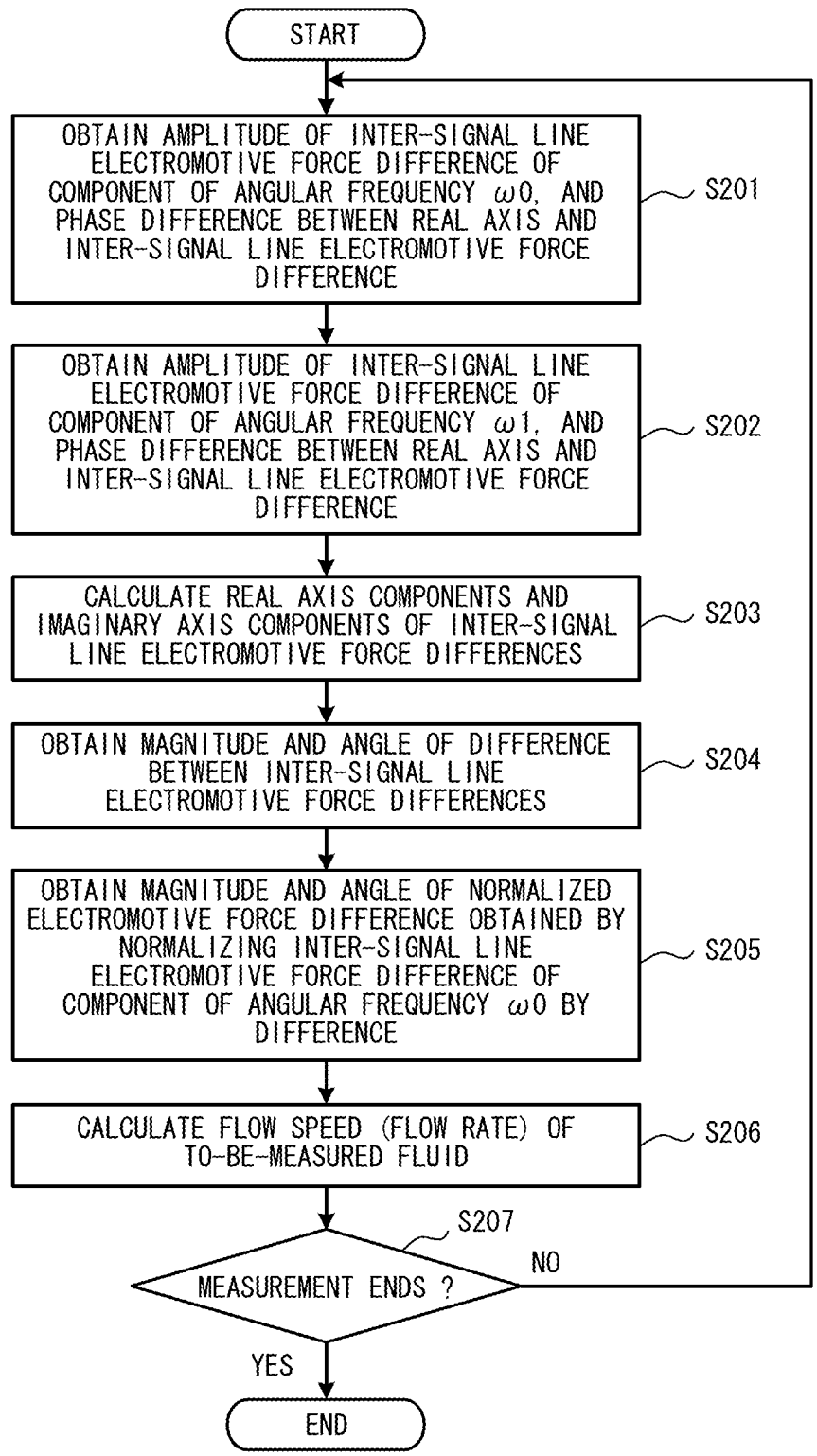
FIG. 16 is a flowchart showing an operation of a signal conversion unit and a flow rate output unit in a second embodiment of the present invention.

FIG. 16 is a flowchart showing an operation of the signal conversion unit 5a and the flow rate output unit 6a of the present embodiment. First, the signal conversion unit 5a obtains an amplitude r0 of the electromotive force difference Ed0 of a component of the angular frequency ω0 in the inter-signal line electromotive force difference, and also obtains a phase difference φ0 between the real axis and the inter-signal line electromotive force difference Ed0 by using the phase detector (step S201 in FIG. 16). Further, the signal conversion unit 5a obtains an amplitude r1 of the electromotive force difference Ed1 of a component of the angular frequency ω1 in the inter-signal line electromotive force difference, and also obtains a phase difference φ1 between the real axis and the inter-signal line electromotive force difference Ed1 by using the phase detector (step S202). The inter-signal line electromotive force differences Ed0 and Ed1 can be frequency-separated by a band-pass filter. However, actually, when a comb-shaped digital filter called a comb filter is used, the two components of the angular frequencies ω0 and ω1 can be easily separated.

Next, the signal conversion unit 5a calculates a real axis component Ed0x and an imaginary axis component Ed0y of the inter-signal line electromotive force difference Ed0, and a real axis component Ed1x and an imaginary axis component Ed1y of the inter-signal line electromotive force difference Ed1 on the basis of the following equations (step S203):

$$Ed0x = r0 \cdot \cos(\varphi 0) \quad (78)$$

$$Ed0y = r0 \cdot \sin(\varphi 0) \quad (79)$$

$$Ed1x = r1 \cdot \cos(\varphi 1) \quad (80)$$

$$Ed1y = r1 \cdot \sin(\varphi 1) \quad (81)$$

After the calculation of the equations (78) to (81), the signal conversion unit 5a obtains a magnitude and an angle of the electromotive force difference EdA between the inter-signal line electromotive force differences Ed0 and Ed1 (step S204). The process at step S204 corresponds to the process of obtaining a ∂A/∂t component and a v×B component, and corresponds to the process of calculation of the equation (75). The signal conversion unit 5a calculates a magnitude |EdA| of the electromotive force difference EdA between the inter-signal line electromotive force differences Ed0 and Ed1 on the basis of the following equation:

$$|EdA| = \{(Ed0x - Ed1x)^2 + (Ed0y - Ed1y)^2\}^{1/2} \omega 0/(\omega 0 - \omega 1) \quad (82)$$

Then, the signal conversion unit 5a calculates an angle ∠EdA of the electromotive force difference EdA with respect to the real axis on the basis of the following equation:

$$\angle EdA = \tan^{-1}\{(Ed0y-Ed1y)/(Ed0x-Ed1x)\} \quad (83)$$

The process at step S204 ends therewith.

Next, the flow rate output unit 6a obtains a magnitude and an angle of the normalized electromotive force difference Ean obtained by normalizing the inter-signal line electromotive force difference Ed0 by the electromotive force difference EdA (step S205). The process at step S205 corresponds to the process of calculation of the equation (76). The flow rate output unit 6a calculates a magnitude |Ean| of the normalized electromotive force difference Ean on the basis of the following equation:

$$|Ean| = (r0/|EdA|)\cdot\omega 0 \quad (84)$$

Further, the flow rate output unit 6a calculates an angle ∠Ean of the normalized electromotive force difference Ean with respect to the real axis on the basis of the following equation:

$$\angle Ean = \phi 0 - \angle EdA \quad (85)$$

The process at step S205 ends therewith.

Subsequently, the flow rate output unit 6a calculates a magnitude V of the flow speed of the fluid to be measured (step S206). The process at step S206 corresponds to the process of calculation of the equation (77). The flow rate output unit 6a calculates a real axis component A of (Ean−ω0) and an imaginary axis component B of (Ean−ω0) on the basis of the following equations:

$$A = |Ean|\cos(\angle Ean) - \omega 0 \quad (86)$$

$$B = |Ean|\sin(\angle Ean) \quad (87)$$

Then, the flow rate output unit 6a calculates the magnitude V of the flow speed of the fluid to be measured on the basis of the following equation:

$$V = (A^2+B^2)^{1/2}/\gamma v \quad (88)$$

The process at step S206 ends therewith.

The signal conversion unit 5a and the flow rate output unit 6a perform the above processes at steps S201 to S206 every constant time period, for example, until an instruction to end the measurement is made by an operator (YES at step S207).

As described above, in the present embodiment, the magnetic field including two components that has the same magnitude and different frequencies is applied from the exciting coil 3 to the fluid to be measured; the electromotive force difference EdA (the vector Va of the ∂A/∂t component) is extracted from the inter-signal line electromotive force difference Ed0 of the component of the angular frequency ω0 and the inter-signal line electromotive force difference Ed1 of the component of the angular frequency ω1; and the span applied to the magnitude V of the flow speed of the v×B component in the inter-signal line electromotive force difference Ed0 (the resultant vector Va+Vb), is normalized by using the electromotive force difference EdA, to eliminate the span-variation factor. Thus, accurate span correction can be automatically performed, and flow rate measurement can be performed with high accuracy. In the present embodiment, when the measuring pipe 1, the electrodes 2a and 2b, and the exciting coil 3, which are components of a detector of a conventional general-form electromagnetic flowmeter, are used, and the signal lines 4a and 4b are provided such that an electromotive force is generated by a change in the magnetic field with passage of time, accurate span correction can be automatically performed. Therefore, the effect that can be obtained only in an asymmetrical excitation electromagnetic flowmeter, can be achieved in a general-form electromagnetic flowmeter without greatly changing the configuration of a detector thereof.

In the present embodiment, the exciting current that simultaneously includes the sine wave component of the angular frequency ω0 and the sine wave component of the angular frequency ω1, is supplied to the exciting coil 3. However, the present invention is not limited to this, and exciting current including a sine wave component of the angular frequency ω0, and exciting current including a sine wave component of the angular frequency ω1, may be alternately supplied to the exciting coil 3. Further, in the present embodiment, the inter-signal line electromotive force difference Ed0 of the component of the angular frequency ω0 is normalized. However, the inter-signal line electromotive force difference Ed1 of the component of the angular frequency ω1 may be normalized.

Third Embodiment

Description of a third embodiment of the present invention will be given below. In the present embodiment, the second configuration described in the above principle is used, the third extraction method is used as a method for extracting the vector Va of the ∂A/∂t component, and the second correction method is used as a method for span correction.

FIG. 17 is a block diagram showing a configuration of an electromagnetic flowmeter according to the third embodiment of the present invention. The electromagnetic flowmeter of the present embodiment includes: a measuring pipe 1; electrodes 2a and 2b; an exciting coil 3; signal lines 4a and 4b that are connected to the electrodes 2a and 2b at one ends thereof and provided so as to extend in directions opposite to each other from a plane PLN including the electrodes 2a and 2b; a signal conversion unit 5b that is connected to other ends of the signal lines 4a and 4b and extracts a ∂A/∂t component from an electromotive force that is obtained from the signal lines 4a and 4b; a flow rate output unit 6b that eliminates, on the basis of the extracted ∂A/∂t component, a variation factor as to a span that is a coefficient applied to a magnitude V of the flow speed of a v×B component in the electromotive force, and calculates the flow rate of fluid to be measured on the basis of the result in which the variation factor is eliminated; and a power supply 7.

In FIG. 17, of a magnetic field generated from the exciting coil 3, a magnetic field component (magnetic flux density) B1 that is perpendicular to both an electrode axis EAX connecting the electrodes 2a and 2b and a measuring pipe axis PAX on the electrode axis EAX, is given as follows:

$$B1 = b1\cdot\cos(\omega 0\cdot t - \theta 1) \quad (89)$$

In the equation (89), "b1" indicates the amplitude of the magnetic flux density B1; "ω0" indicates an angular frequency; and "θ1" indicates the phase difference (phase lag) between the magnetic flux density B1 and ω0·t. Hereinafter, the magnetic flux density B1 is referred to as magnetic field B1. Similarly to the first embodiment, an inter-signal line electromotive force difference is the difference between an electromotive force detected at the end of the signal line 4b on the signal conversion unit side; and an electromotive force detected at the end of the signal line 4a on the signal conversion unit side, and an inter-signal line electromotive force sum is the sum of the electromotive force detected at the end of the signal line 4b on the signal conversion unit side; and the electromotive force detected at the end of the signal line 4a on the signal conversion unit side.

Of an overall inter-signal line electromotive force difference that is obtained by summing an electromotive force difference obtained by rewriting, to a complex vector, an inter-signal line electromotive force difference resulting from a change in the magnetic field B1 with passage of time; and an electromotive force difference obtained by rewriting, to a complex vector, an inter-signal line electromotive force difference resulting from the flow speed V of the fluid to be measured and the magnetic field B1, an inter-signal line electromotive force difference of a component of an angular frequency ω0 is indicated by "EdR0". In this case, the inter-signal line electromotive force difference EdR0 is represented by equation (90) corresponding to the equation (35).

$$EdR0 = rkd \cdot \omega 0 \cdot b1 \cdot \exp\{j \cdot (\pi/2 + \theta 1 + \theta d)\} + rky \cdot V \cdot b1 \cdot \exp\{j \cdot (\theta 1 + \theta v)\} \quad (90)$$

Further, of an overall inter-signal line electromotive force sum that is obtained by summing an electromotive force sum obtained by rewriting, to a complex vector, an inter-signal line electromotive force sum resulting from a change in the magnetic field B1 with passage of time; and an electromotive force sum obtained by rewriting, to a complex vector, an inter-signal line electromotive force sum resulting from the flow speed V of the fluid to be measured and the magnetic field B1, an inter-signal line electromotive force sum of the component of the angular frequency ω0 is indicated by "EsR0". In this case, the inter-signal line electromotive force sum EsR0 is represented by equation (91) corresponding to the equation (24).

$$EsR0 = rks \cdot \omega 0 \cdot b1 \cdot \exp\{j \cdot (\pi/2 + \theta 1 + \theta s)\} \quad (91)$$

Here, when it is assumed that θv=θs+Δθv and rkv=γv·rks, and they are substituted into the equation (90), the inter-signal line electromotive force difference EdR0 is represented by the following equation:

$$EdR0 = rkd \cdot \omega 0 \cdot b1 \cdot \exp\{j \cdot (\pi/2 + \theta 1 + \theta d)\} + \gamma v \cdot rks \cdot V \cdot b1 \cdot \exp\{j \cdot (\theta \theta 1 + \theta s + \Delta \theta v)\} \quad (92)$$

The inter-signal line electromotive force sum EsR0 shown in the equation (91) is unrelated to the magnitude V of the flow speed, and thus includes only the component generated by ∂A/∂t. By using the inter-signal line electromotive force sum EsR0, the coefficient (span) applied to the magnitude V of the flow speed of the v×B component in the inter-signal line electromotive force difference EdR0 (the resultant vector Va+Vb), is normalized.

When the result obtained by normalizing the inter-signal line electromotive force difference EdR0 shown in the equation (92) by the inter-signal line electromotive force sum EsR0 shown in the equation (91), and performing multiplication by ω0, is indicated by "Ean2", the normalized electromotive force difference Ean2 is represented by the following equation:

$$\begin{aligned} Ean2 &= (EdR0/EsR0) \cdot \omega 0 \quad (93)\\ &= [rkd \cdot \omega 0 \cdot b1 \cdot \exp\{j \cdot (\pi/2 + \theta d)\} + \\ &\quad \gamma v \cdot rks \cdot V \cdot b1 \cdot \exp\{j \cdot (\theta 1 + \theta s + \Delta \theta v)\}]/ \\ &\quad [rks \cdot \omega 0 \cdot b1 \cdot \exp\{j \cdot (\pi/2 + \theta 1 + \theta s)\}] \cdot \omega 0 \\ &= rkd/rks \cdot \exp\{j \cdot (\theta d - \theta s)\} \cdot \omega 0 + \\ &\quad [\gamma v \cdot \exp\{j \cdot (-\pi/2 + \Delta \theta v)\}] \cdot V \end{aligned}$$

The second term on the right-hand side of the equation (93) is a term obtained by normalizing the component generated by v×B, by the component generated by ∂A/∂t. Note that the reason why the result obtained by normalizing the inter-signal line electromotive force difference EdR0 by the electromotive force difference EsR0 is multiplied by ω0 is for eliminating the exciting angular frequency ω0 from the second term on the right-hand side concerning the magnitude V of the flow speed. According to the equation (93), the complex coefficient applied to the magnitude V of the flow speed has a magnitude of γv and a phase difference of −π/2+Δθv from the real axis. The coefficient γv and the angle Δθv are constants that can be obtained in advance by calibration or the like, and the second term on the right-hand side of the equation (93) is maintained constant unless the flow speed of the fluid to be measured changes.

Therefore, by normalizing the v×B component by using the ∂A/∂t component, span correction can be achieved, which automatically corrects an error caused by a shift of the magnetic field and/or a phase change. Here, when the signal lines 4a and 4b are located on the different sides of the plane PLN including the electrodes 2a and 2b, so as to be substantially rotationally symmetrical with respect to the axis of the exciting coil 3, it is satisfied that rdk≈0 and θd−θs≈0, and the magnitude V of the flow speed is represented as follows:

$$\begin{aligned} V &= |Ean2/[\gamma v \cdot \exp\{j \cdot (-\pi/2 + \Delta \theta v)\}]| \quad (94)\\ &= |Ean2|/\gamma v \end{aligned}$$

Note that the correspondence relation between the constants and the variables used in the above basic principle; and the constants and the variables used in the present embodiment is shown in Table 3 set forth below. The coefficient γv and the angle Δθv are constants that can be obtained in advance by calibration or the like. As is clear from Table 3, the present embodiment is one of examples that concretely implements the above basic principle.

TABLE 3

Correspondence Relation between Basic Principle and Third Embodiment

| Constants and Variables in Basic Principle | Constants and Variables in Third Embodiment |
| --- | --- |
| rα | 1 |
| rβ | γv |
| θα | π/2 |
| θβ | Δθv |
| C | rks · b1 · exp {j · (θ1 + θs)} |

Description of a specific operation of the electromagnetic flowmeter of the present embodiment will be given below. Similarly to the first embodiment, the power supply 7 supplies, to the exciting coil 3, exciting current having a sine wave component of the angular frequency ω0.

Figure 18:
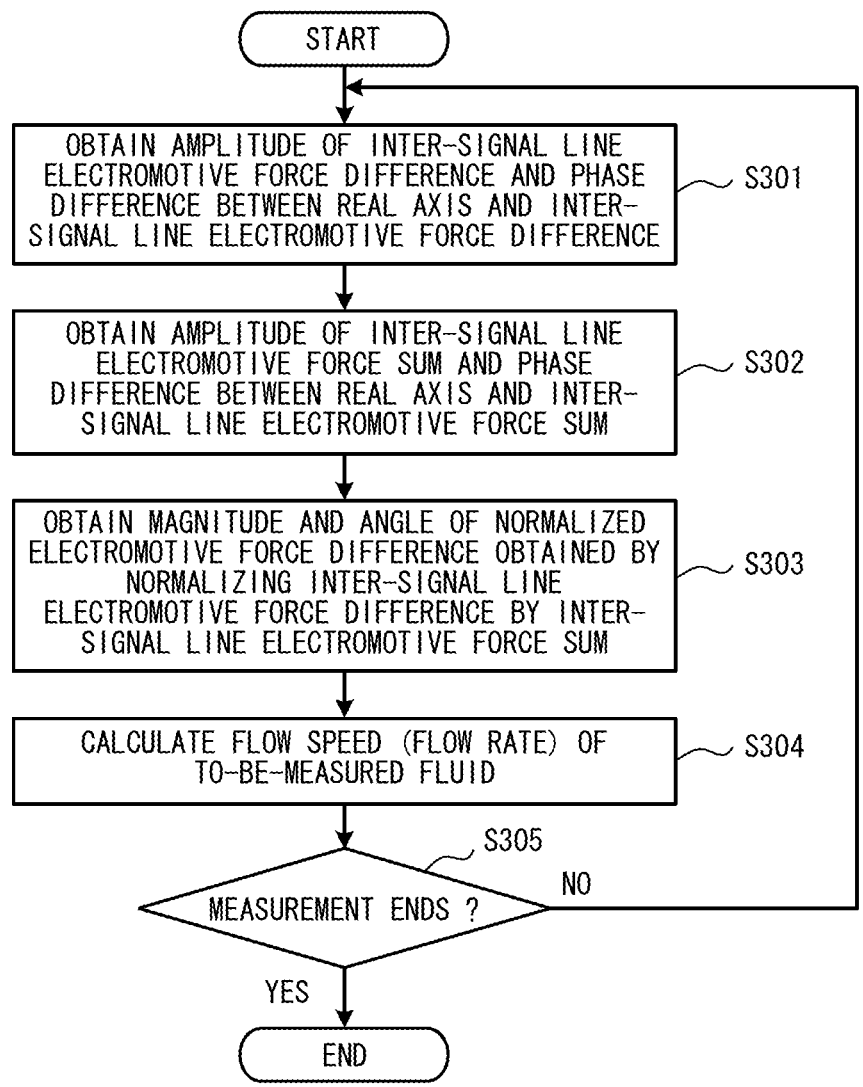
FIG. 18 is a flowchart showing an operation of a signal conversion unit and a flow rate output unit in the third embodiment of the present invention.

FIG. 18 is a flowchart showing an operation of the signal conversion unit 5b and the flow rate output unit 6b. First, the signal conversion unit 5b obtains an amplitude rd of the inter-signal line electromotive force difference EdR0 that is a component of the angular frequency ω0 in the inter-signal line electromotive force difference, and also obtains a phase difference φd between the real axis and the inter-signal line electromotive force difference EdR0 by using a phase detector (step S301 in FIG. 18). Further, the signal conversion unit 5b obtains an amplitude rs of the inter-signal line electromotive force sum EsR0 that is a component of the angular frequency ω0 in the inter-signal line electromotive force sum, and also obtains a phase difference φs between the real axis and the inter-signal line electromotive force sum EsR0 by using the phase detector (step S302).

Next, the flow rate output unit 6b obtains a magnitude and an angle of the normalized electromotive force difference Ean2 obtained by normalizing the inter-signal line electromotive force difference EdR0 by the inter-signal line electromotive force sum EsR0 (step S303). The process at step S303 corresponds to the process of calculation of the equation (93). The flow rate output unit 6b calculates a magnitude |Ean2| of the normalized electromotive force difference Ean2 on the basis of the following equation:

$$|Ean2|=(rd/rs)\cdot\omega0 \qquad (95)$$

Further, the flow rate output unit 6b calculates an angle ∠Ean2 of the normalized electromotive force difference Ean2 with respect to the real axis on the basis of the following equation:

$$\angle Ean2=\phi d-\phi s \qquad (96)$$

The process at step S303 ends therewith.

Subsequently, the flow rate output unit 6b calculates a magnitude V of the flow speed of the fluid to be measured on the basis of the equation (94) (step S304). The signal conversion unit 5b and the flow rate output unit 6b perform the above processes at steps S301 to S304 every constant time period, for example, until an instruction to end the measurement is made by an operator (YES at step S305).

As described above, in the present embodiment, the inter-signal line electromotive force sum EsR0 is extracted as a ∂A/∂t component, and the span applied to the magnitude V of the flow speed of the v×B component in the inter-signal line electromotive force difference EdR0 (the resultant vector Va+Vb) is normalized by using the inter-signal line electromotive force sum EsR0, to eliminate the span-variation factor. Thus, accurate span correction can be automatically performed, and flow rate measurement can be performed with high accuracy. In the present embodiment, when the measuring pipe 1, the electrodes 2a and 2b, and the exciting coil 3, which are components of a detector of a conventional general-form electromagnetic flowmeter, are used, and the signal lines 4a and 4b are provided so as to extend in the directions opposite to each other from the plane PLN including the electrodes 2a and 2b, accurate span correction can be automatically performed. Therefore, the effect that can be obtained only in an asymmetrical excitation electromagnetic flowmeter, can be achieved in a general-form electromagnetic flowmeter without greatly changing the configuration of a detector thereof.

Fourth Embodiment

Description of a fourth embodiment of the present invention will be given below. In the present embodiment, the third configuration described in the above principle is used, the third extraction method is used as a method for extracting the vector Va of the ∂A/∂t component, and the second correction method is used as a method for span correction.

Figure 19:
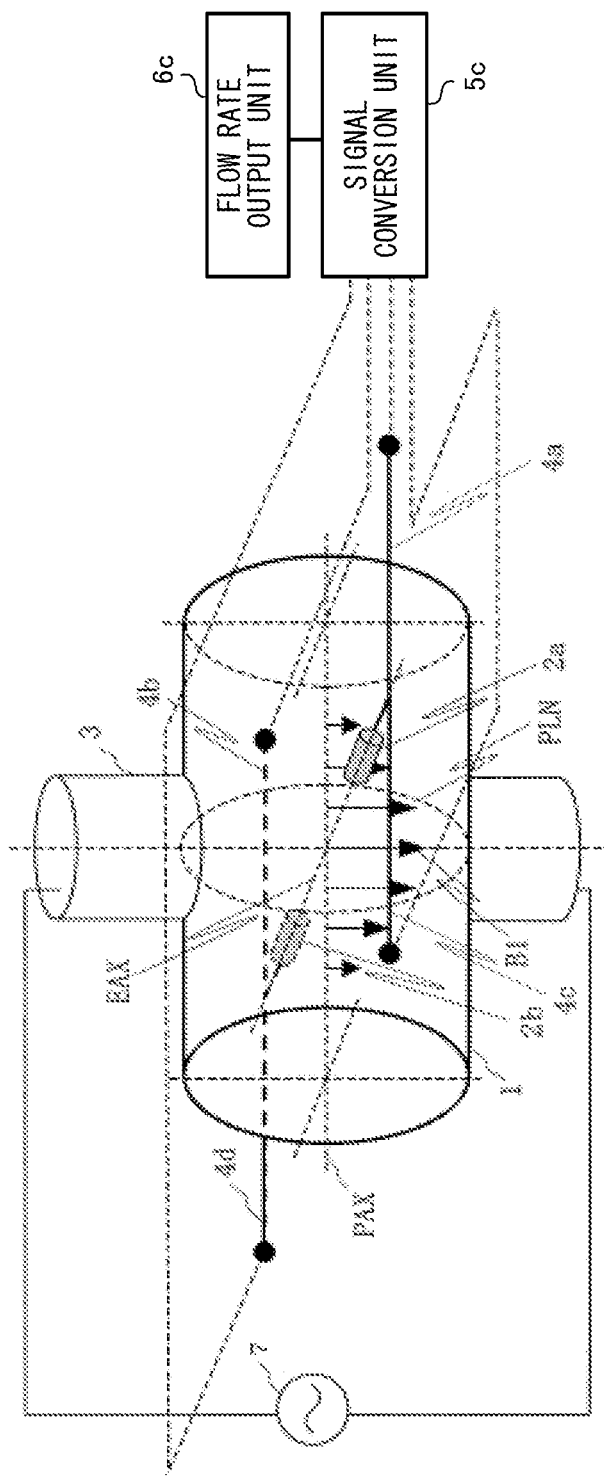
FIG. 19 is a block diagram showing a configuration of an electromagnetic flowmeter according to a fourth embodiment of the present invention.

FIG. 19 is a block diagram showing a configuration of an electromagnetic flowmeter according to the fourth embodiment of the present invention. The electromagnetic flowmeter of the present embodiment includes: a measuring pipe 1; electrodes 2a and 2b; an exciting coil 3; first signal lines 4a and 4b that are connected to the electrodes 2a and 2b at one ends thereof; second signal lines 4c and 4d that are connected to the electrodes 2a and 2b at one ends thereof and provided so as to extend in directions opposite to the directions of the first signal lines 4a and 4b from a plane PLN including the electrodes 2a and 2b; a signal conversion unit 5c that is connected to other ends of the signal lines 4a, 4b, 4c, and 4d and extracts a ∂A/∂t component from an electromotive force that is obtained from the signal lines 4a, 4b, 4c, and 4d; a flow rate output unit 6c that eliminates, on the basis of the extracted ∂A/∂t component, a variation factor as to a span that is a coefficient applied to a magnitude V of the flow speed of a v×B component in the electromotive force, and calculates the flow rate of fluid to be measured on the basis of the result in which the variation factor is eliminated; and a power supply 7.

In FIG. 19, of a magnetic field generated from the exciting coil 3, a magnetic field component (magnetic flux density) B1 that is perpendicular to both an electrode axis EAX connecting the electrodes 2a and 2b and a measuring pipe axis PAX on the electrode axis EAX, is given as follows:

$$B1=b1\cdot\cos(\omega0\cdot t-\theta1) \qquad (97)$$

In the equation (97), "b1" indicates the amplitude of the magnetic flux density B1; "ω0" indicates an angular frequency; and "θ1" indicates the phase difference (phase lag) between the magnetic flux density B1 and ω0·t. Hereinafter, the magnetic flux density B1 is referred to as magnetic field B1. The difference between an electromotive force detected at the end of the first signal line 4b on the signal conversion unit side; and an electromotive force detected at the end of the first signal line 4a on the signal conversion unit side, is referred to as first inter-signal line electromotive force difference, and the difference between an electromotive force detected at the end of the second signal line 4d on the signal conversion unit side; and an electromotive force detected at the end of the second signal line 4c on the signal conversion unit side, is referred to as second inter-signal line electromotive force difference.

Of an overall first inter-signal line electromotive force difference that is obtained by summing an electromotive force difference obtained by rewriting, to a complex vector, a first inter-signal line electromotive force difference resulting from a change in the magnetic field B1 with passage of time; and an electromotive force difference obtained by rewriting, to a complex vector, a first inter-signal line electromotive force difference resulting from the flow speed V of the fluid to be measured and the magnetic field B1, an inter-signal line electromotive force difference of a component of an angular frequency ω0 is indicated by "E1d0". In this case, the first inter-signal line electromotive force difference E1d0 is represented by equation (98) corresponding to the equation (36).

$$E1d0=rks1\cdot\omega0\cdot b1\cdot\exp\{j\cdot(\pi/2+\theta1+\theta s1)\}+ rkv\cdot V\cdot b1\cdot\exp\{j\cdot(\theta1+\theta v)\} \qquad (98)$$

Of an overall second inter-signal line electromotive force difference that is obtained by summing an electromotive force difference obtained by rewriting, to a complex vector, a second inter-signal line electromotive force difference resulting from the change in the magnetic field B1 with passage of time; and an electromotive force difference obtained by rewriting, to a complex vector, a second inter-signal line electromotive force difference resulting from the flow speed V of the fluid to be measured and the magnetic field B1, an inter-signal line electromotive force difference of the component of the angular frequency ω0 is indicated by "E2d0". In this case, the second inter-signal line electromotive force difference E2d0 is represented by equation (99) corresponding to the equation (37).

$$E2d0=-rks2\omega0\cdot b1\cdot\exp\{j\cdot(\pi/2+\theta1+\theta s2)\}+ rkv\cdot V\cdot b1\cdot\exp\{j\cdot(\theta1+\theta v)\} \qquad (99)$$

Using the equations (98) and (99), the sum Esd of the first inter-signal line electromotive force difference E1d0 and the second inter-signal line electromotive force difference E2d0 is represented by the following equation:

$$\begin{aligned}
Esd &= E1d0 + E2d0 \quad (100)\\
&= rks1 \cdot \omega 0 \cdot b1 \cdot \exp\{j \cdot (\pi/2 + \theta 1 + \theta s1)\} +\\
&\quad rkv \cdot V \cdot b1 \cdot \exp\{j \cdot (\theta 1 + \theta v)\} -\\
&\quad rks2 \cdot \omega 0 \cdot b1 \cdot \exp\{j \cdot (\pi/2 + \theta 1 + \theta s2)\} +\\
&\quad rkv \cdot V \cdot b1 \cdot \exp\{j \cdot (\theta 1 + \theta v)\}\\
&= \{rks1 \cdot \exp(j \cdot \theta s1) - rks2 \cdot \exp(j \cdot \theta s2)\} \cdot\\
&\quad \omega 0 \cdot b1 \cdot \exp\{j \cdot (\pi/2 + \theta 1)\} +\\
&\quad 2 \cdot rkv \cdot V \cdot b1 \cdot \exp\{j \cdot (\theta 1 + \theta v)\}
\end{aligned}$$

Further, using the equations (98) and (99), the difference Edd between the first inter-signal line electromotive force difference E1d0 and the second inter-signal line electromotive force difference E2d0 is represented by the following equation:

$$\begin{aligned}
Edd &= E1d0 - E2d0 \quad (101)\\
&= rks1 \cdot \omega 0 \cdot b1 \cdot \exp\{j \cdot (\pi/2 + \theta 1 + \theta s1)\} +\\
&\quad rkv \cdot V \cdot b1 \cdot \exp\{j \cdot (\theta 1 + \theta v)\} +\\
&\quad rks2 \cdot \omega 0 \cdot b1 \cdot \exp\{j \cdot (\pi/2 + \theta 1 + \theta s2)\} -\\
&\quad rkv \cdot V \cdot b1 \cdot \exp\{j \cdot (\theta 1 + \theta v)\}\\
&= \{rks1 \cdot \exp(j \cdot \theta s1) + rks2 \cdot \exp(j \cdot \theta s2)\} \cdot\\
&\quad \omega 0 \cdot b1 \cdot \exp\{j \cdot (\pi/2 + \theta 1)\}
\end{aligned}$$

Here, in order to make it easy to handle the equation, the sum of two vectors of rks1·exp(j·θs1) and rks2·exp(j·θs2) is rewritten to rkss·exp(j·θss) as shown in equation (102), and the difference between the two vectors of rks1·exp(j·θs1) and rks2·exp(j·θs2) is rewritten to rksd·exp(j·θsd) as shown in equation (103).

$$rks1 \cdot \exp(j \cdot \theta s1) + rks2 \cdot \exp(j \cdot \theta s2) = rkss \cdot \exp(j \cdot \theta ss) \quad (102)$$

$$rks1 \cdot \exp(j \cdot \theta s1) - rks2 \cdot \exp(j \cdot \theta s2) = rksd \cdot \exp(j \cdot \theta sd) \quad (103)$$

The electromotive force sum Esd shown in the equation (100) is rewritten by using the equation (103) as shown in equation (104), and the electromotive force difference Edd shown in the equation (101) is rewritten by using the equation (102) as shown in equation (105).

$$Esd = rksd \cdot \exp(j \cdot \theta sd) \cdot \omega 0 \cdot b1 \cdot \exp\{j \cdot (\pi/2+\theta 1)\} + 2 \cdot rkv \cdot V \cdot b1 \cdot \exp\{j \cdot (\theta 1+\theta v)\} \quad (104)$$

$$Edd = rkss \cdot \exp(j \cdot \theta ss) \cdot \omega 0 \cdot b1 \cdot \exp\{j \cdot (\pi/2+\theta 1)\} \quad (105)$$

Here, when it is assumed that θv=θss+Δθv and 2·rkv=γv·rkss, and they are substituted into the equation (104), the electromotive force sum Esd is represented by the following equation:

$$Esd = rksd \cdot \exp(j \cdot \theta sd) \cdot \omega 0 \cdot b1 \cdot \exp\{j \cdot (\pi/2+\theta 1)\} + \gamma v \cdot rkss \cdot V \cdot b1 \cdot \exp\{j \cdot (\theta 1+\theta ss+\Delta \theta v)\} \quad (106)$$

The electromotive force difference Edd shown in the equation (105) is unrelated to the magnitude V of the flow speed, and thus includes only the component generated by ∂A/∂t. By using the electromotive force difference Edd, the coefficient (span) applied to the magnitude V of the flow speed of the v×B component in the electromotive force sum Esd (the resultant vector Va+Vb) is normalized.

When the result obtained by normalizing the electromotive force sum Esd shown in the equation (106) by the electromotive force difference Edd shown in the equation (105), and performing multiplication by ω0, is indicated by "Ean3", the normalized electromotive force sum Ean3 is represented by the following equation:

$$\begin{aligned}
Ean3 &= (Esd/Edd) \cdot \omega 0 \quad (107)\\
&= [rksd \cdot \exp(j \cdot \theta sd) \cdot \omega 0 \cdot b1 \cdot \exp\{j \cdot (\pi/2 + \theta 1)\} +\\
&\quad \gamma v \cdot rkss \cdot V \cdot b1 \cdot \exp\{j \cdot (\theta 1 + \theta ss + \Delta \theta v)\}]/\\
&\quad [rkss \cdot \exp(j \cdot \theta ss) \cdot \omega 0 \cdot b1 \cdot \exp\{j \cdot (\pi/2 + \theta 1)\} \cdot \omega 0\\
&= [\{rksd \cdot \exp(j \cdot \theta sd)\}/\{rkss \cdot \exp(j \cdot \theta ss)\}] \cdot\\
&\quad \omega 0 + [\gamma v \cdot \exp\{j \cdot (-\pi/2 + \Delta \theta v)\}] \cdot V
\end{aligned}$$

The second term on the right-hand side of the equation (107) is a term obtained by normalizing the component generated due to "v×B, by the component generated by ∂A/∂t. Note that the reason why the result obtained by normalizing the electromotive force sum Esd by the electromotive force difference Edd is multiplied by ω0 is for eliminating the exciting angular frequency ω0 from the second term on the right-hand side concerning the magnitude V of the flow speed. According to the equation (107), the complex coefficient applied to the magnitude V of the flow speed has a magnitude of γv and a phase difference of −π/2+Δθv from the real axis. The coefficient γv and the angle Δθv are constants that can be obtained in advance by calibration or the like, and the second term on the right-hand side of the equation (107) is maintained constant unless the flow speed of the fluid to be measured changes.

Therefore, by normalizing the v×B component by using the ∂A/∂t component, span correction can be achieved, which automatically corrects an error caused by a shift of the magnetic field and/or a phase change. Here, when the first signal lines 4a and 4b and the second signal lines 4c and 4d are located so as to be substantially symmetrical with respect to the plane PLN including the electrodes 2a and 2b, it is satisfied that rksd≈0 and θsd−θdd≈0, and the magnitude V of the flow speed is represented as follows:

$$V = |Ean3/[\gamma v \cdot \exp\{j \cdot (\pi/2 + \Delta \theta v)\}]| \quad (108)$$

$$= |Ean3|/\gamma v$$

Note that the correspondence relation between the constants and the variables used in the above basic principle; and the constants and the variables used in the present embodiment is shown in Table 4 set forth below. The coefficient γv and the angle Δθv are constants that can be obtained in advance by calibration or the like. As is clear from Table 4, the present embodiment is one of examples that concretely implements the above basic principle.

TABLE 4

Correspondence Relation between Basic
Principle and Fourth Embodiment

| Constants and Variables in Basic Principle | Constants and Variables in Fourth Embodiment |
|---|---|
| rα | 1 |
| rβ | γv |
| θα | π/2 |
| θβ | Δθv |
| C | rkss · b1 · exp {j · (θ1 + θss)} |

Description of a specific operation of the electromagnetic flowmeter of the present embodiment will be given below. Similarly to the first embodiment, the power supply 7 supplies, to the exciting coil 3, exciting current having a sine wave component of the angular frequency ω0.

Figure 20:
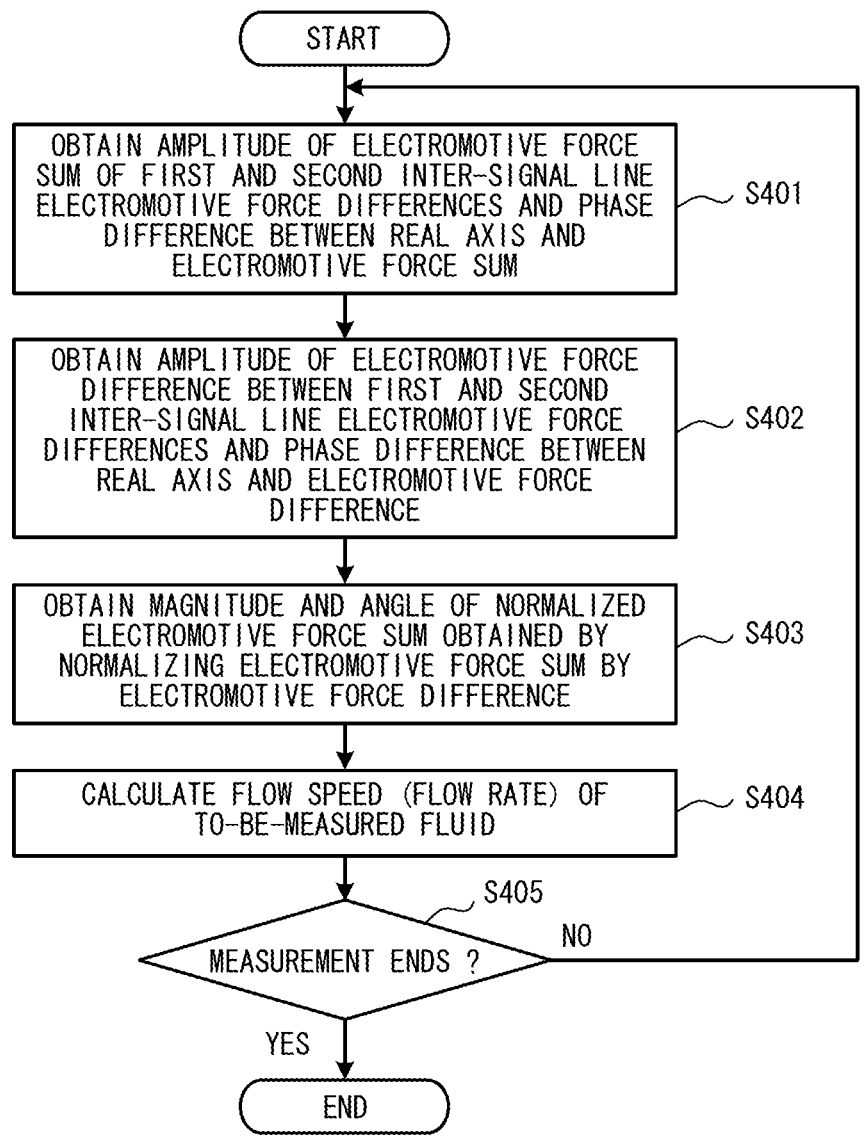
FIG. 20 is a flowchart showing an operation of a signal conversion unit and a flow rate output unit in the fourth embodiment of the present invention.

FIG. 20 is a flowchart showing an operation of the signal conversion unit 5c and the flow rate output unit 6c. First, the signal conversion unit 5c obtains an amplitude rsd of the electromotive force sum Esd of the first inter-signal line electromotive force difference E1d0 and the second inter-signal line electromotive force difference E2d0, and also obtains a phase difference φsd between the real axis and the electromotive force sum Esd by using a phase detector (step S401 in FIG. 20). Further, the signal conversion unit 5c obtains an amplitude rdd of the electromotive force difference Edd between the first inter-signal line electromotive force difference E1d0 and the second inter-signal line electromotive force difference E2d0, and also obtains a phase difference φdd between the real axis and the electromotive force difference Edd by using the phase detector (step S402).

Next, the flow rate output unit 6c obtains a magnitude and an angle of the normalized electromotive force sum Ean3 obtained by normalizing the electromotive force sum Esd by the electromotive force difference Edd (step S403). The process at step S403 corresponds to the process of calculation of the equation (107). The flow rate output unit 6c calculates a magnitude |Ean3| of the normalized electromotive force sum Ean3 on the basis of the following equation:

$$|Ean3|=(rsd/rdd)\cdot\omega 0 \quad (109)$$

Further, the flow rate output unit 6c calculates an angle ∠Ean3 of the normalized electromotive force sum Ean3 with respect to the real axis on the basis of the following equation:

$$\angle Ean3=\phi sd-\phi dd \quad (110)$$

The process at step S403 ends therewith.

Subsequently, the flow rate output unit 6c calculates a magnitude V of the flow speed of the fluid to be measured on the basis of the equation (108) (step S404). The signal conversion unit 5c and the flow rate output unit 6c perform the above processes at steps S401 to S404 every constant time period, for example, until an instruction to end the measurement is made by an operator (YES at step S405).

As described above, in the present embodiment, the electromotive force difference Edd between the first inter-signal line electromotive force difference E1d0 and the second inter-signal line electromotive force difference E2d0 is extracted as a ∂A/∂t component, and the span applied to the magnitude V of the flow speed of the v×B component in the electromotive force sum Esd (the resultant vector Va+Vb) of the first inter-signal line electromotive force difference E1d0 and the second inter-signal line electromotive force difference E2d0, is normalized by using the electromotive force difference Edd, to eliminate the span-variation factor. Thus, accurate span correction can be automatically performed, and flow rate measurement can be performed with high accuracy. In the present embodiment, when the measuring pipe 1, the electrodes 2a and 2b, and the exciting coil 3, which are components of a detector of a conventional general-form electromagnetic flowmeter, are used, and the first signal lines 4a and 4b and the second signal lines 4c and 4d are provided such that the second signal lines 4c and 4d extend in the directions opposite to the directions of the first signal lines 4a and 4b from the plane PLN including the electrodes 2a and 2b, accurate span correction can be automatically performed. Therefore, the effect that can be obtained only in an asymmetrical excitation electromagnetic flowmeter, can be achieved in a general-form electromagnetic flowmeter without greatly changing the configuration of a detector thereof.

Fifth Embodiment

Figure 21:
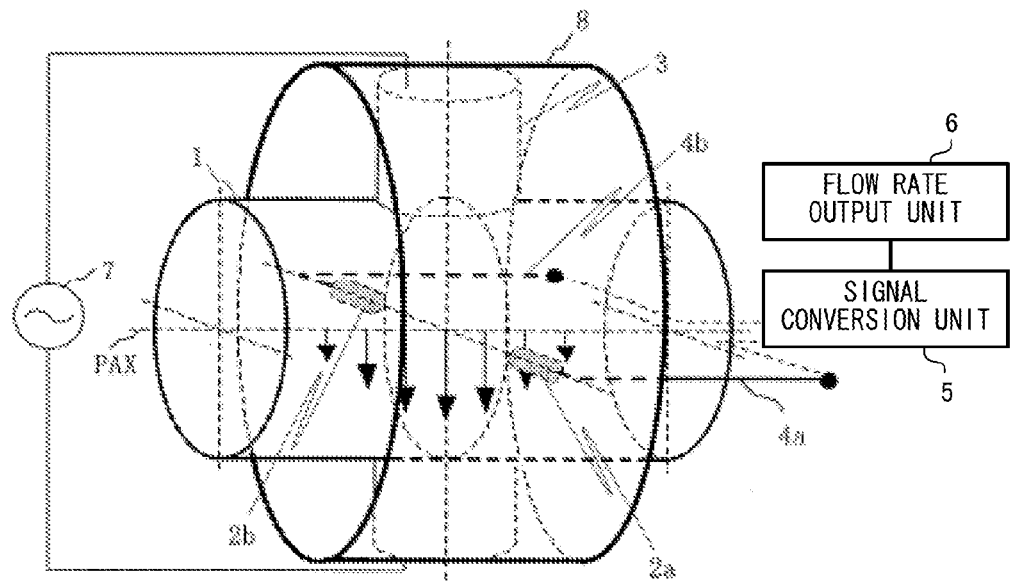
FIG. 21 is a block diagram showing a configuration of an electromagnetic flowmeter according to a fifth embodiment of the present invention.

Description of a fifth embodiment of the present invention will be given below. In a general electromagnetic flowmeter, in order to efficiently return to an exciting coil a magnetism generated from the exciting coil, the electromagnetic flowmeter is often covered with a magnetic member called an outer core. In the first to fourth embodiments, when the signal lines 4a, 4b, 4c, and 4d are located within the outer core, a ∂A/∂t component can be efficiently detected. Such a configuration is effective for all the embodiments. However, an example where this configuration is applied to the first and second embodiments is shown in FIG. 21 as one example. In the example in FIG. 21, the signal lines 4a and 4b are located within an outer core 8.

In the first to fifth embodiments, a sine wave excitation system that uses a sine wave as exciting current is used. However, a rectangular wave excitation system that uses a rectangular wave as exciting current may be used. Note that, however, it is difficult to achieve high-frequency excitation in the case of the rectangular wave excitation system, and thus the rectangular wave excitation system is disadvantageous in terms of: responsiveness with respect to flow rate change; and 1/f noise, when compared to the sine wave excitation system.

Further, in the first to fifth embodiments, the axis of the exciting coil 3, the measuring pipe axis PAX, and the electrode axis EAX are perpendicular to each other and intersect each other at one point. However, the present invention is not limited to this. In the first, second, and fourth embodiments, the axis of the exciting coil 3 may be deviated toward the electrode 2a or the electrode 2b.

Figure 22:
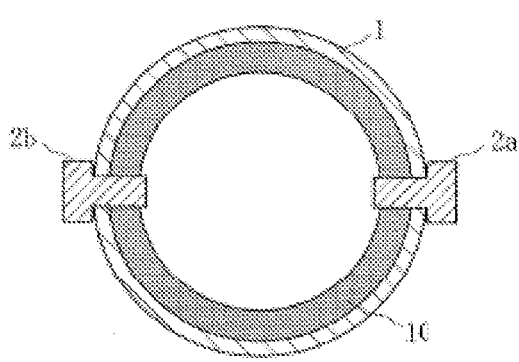
FIG. 22 is a cross-sectional view showing one example of electrodes used in the electromagnetic flowmeters according to the first to fifth embodiments of the present invention.
Figure 23:
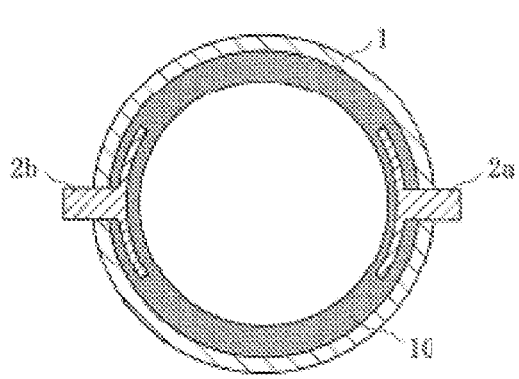
FIG. 23 is a cross-sectional view showing another example of the electrodes used in the electromagnetic flowmeters according to the first to fifth embodiments of the present invention.
Figure 28:
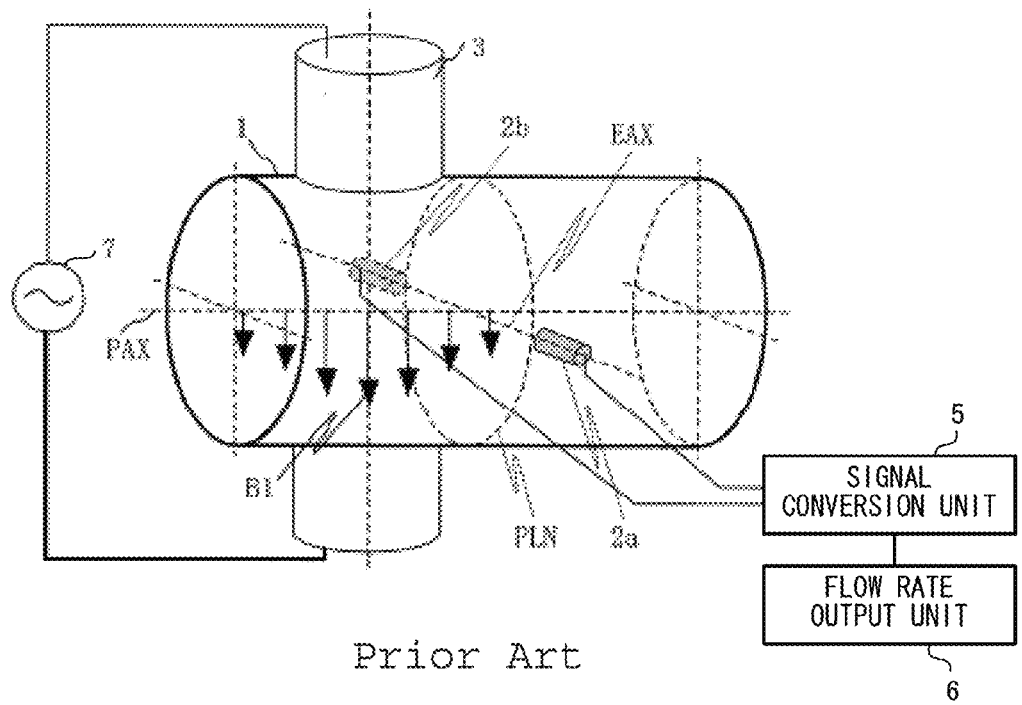
FIG. 28 is a block diagram showing a configuration of a conventional asymmetrical excitation electromagnetic flowmeter.
Figure 29:
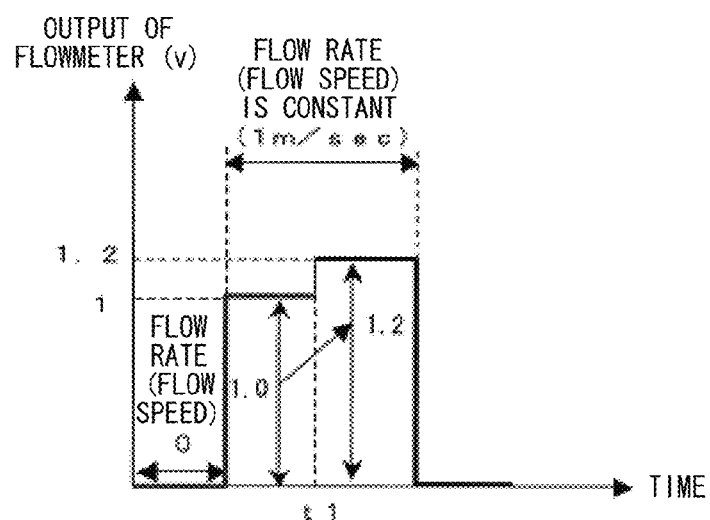
FIG. 29 is a diagram for illustrating a shift of a span in an electromagnetic flowmeter.

Further, the electrodes 2a and 2b used in the first to fifth embodiments may be electrodes of a type which is exposed from the inner wall of the measuring pipe 1 so as to be in contact with the fluid to be measured as shown in FIG. 22, or may be capacitive coupling type electrodes that are not in contact with the fluid to be measured as shown in FIG. 23. When the electrodes 2a and 2b are of capacitive coupling type, the electrodes 2a and 2b are coated with a lining 10 that is formed on the inner wall of the measuring pipe 1 and made from ceramic, Teflon (registered trademark), or the like.

Further, in the first, second, and fourth embodiments, the pair of electrodes 2a and 2b are used, but the present invention is not limited to this, and a single electrode may be used. Note that, however, in the third embodiment, two electrodes are needed. When only one electrode is used, since a ground ring or a ground electrode for grounding the potential of fluid to be measured is provided on the measuring pipe 1, it is only necessary to detect an electromotive force (a difference in potential from the ground potential) generated at the single electrode and the signal line connected to the electrode, by using the signal conversion unit 5a, 5b, or 5c.

In the case of the first embodiment, when a single electrode 2a and a single signal line 4a are used, Ei0 detected by the signal conversion unit 5a is not an inter-signal line electromotive force difference, but is an electromotive force generated at the electrode 2a and the signal line 4a. Similarly, in the case of the second embodiment, each of Ed0 and Ed1 detected by the signal conversion unit 5a is not an inter-signal line electromotive force difference, but is an electromotive force generated at the electrode 2a and the signal line 4a. In the case of the fourth embodiment, when a single electrode 2a and signal lines 4a and 4c are used, E1d0 detected by the signal conversion unit 5c is not a first inter-signal line electromotive force difference, but is a first electromotive force generated at the electrode 2a and the signal line 4a; and E2d0 detected by the signal conversion unit 5c is not a second inter-signal line electromotive force difference, but is a second electromotive force generated at the electrode 2a and the signal line 4c.

When a pair of electrodes is used, an electrode axis is defined as a straight line connecting the pair of electrodes. On the other hand, in the case where only a single electrode is used, when it is assumed that a virtual electrode is placed at a position to face the real electrode through the measuring pipe axis PAX on the plane PLN including the real electrode, an electrode axis is defined as a straight line connecting the real electrode and the virtual electrode.

Further, it is understood that, when the electrodes 2a and 2b used in the first to fifth embodiments are shaped so as to have portions extending in the tube axis direction as shown in FIG. 24, the same effect is obtained as that when the signal lines 4a, 4b, 4c, and 4d are provided.

Further, in the first and second embodiments, as shown in FIG. 25, of the signal lines 4a and 4b connected to the electrodes 2a and 2b, the signal line 4a may be provided so as to be inclined with respect to the direction of a magnetic field parallel to the plane PLN and such that an electromotive force is generated by a change in the magnetic field with passage of time, and the signal line 4b may be provided such that an area of the signal line 4b which is linked with magnetic flux generated from the exciting coil 3 is reduced as much as possible similarly to a general-form electromagnetic flowmeter, thereby preventing an electromotive force from being generated by a change in the magnetic field with passage of time. Similarly, in the fourth embodiment, as shown in FIG. 26, of the signal lines 4a, 4b, 4c, and 4d connected to the electrodes 2a and 2b, the signal lines 4a and 4c connected to the electrode 2a may be provided so as to be inclined with respect to the direction of a magnetic field parallel to the plane PLN and such that an electromotive force is generated by a change in the magnetic field with passage of time, and the signal lines 4b and 4d connected to the electrodes 2b may be provided such that areas of the signal lines 4b and 4d which are linked with magnetic flux generated from the exciting coil 3 are reduced as much as possible, thereby preventing an electromotive force from being generated by a change in the magnetic field with passage of time. Note that, in the example in FIG. 26, the signal lines 4b and 4d may be combined into a single line.

In the above, various arrangement of the signal lines has been described. The above described signal line arrangement does not need to be applied to the entire path from the electrodes 2a and 2b to the signal conversion unit 5a, 5b, or 5c. In other words, as long as the signal line arrangement from the electrodes 2a and 2b to a point in the path toward the signal conversion unit 5a, 5b, or 5c is provided as described above, connection to the signal conversion unit 5a, 5b, or 5c may be made in the rest of the signal line arrangement, such that the effect of a change in the magnetic field is reduced. Examples of manners of arranging signal lines such that the signal lines are unlikely to be affected by a change in a magnetic field include a manner in which a signal line is located at a position where the signal line is less affected by a change in a magnetic field, and a manner in which a signal line is shielded.

Further, in the first to fifth embodiments, the components of the signal conversion unit 5a, 5b, or 5c and the flow rate output unit 6a, 6b, or 6c, other than the electromotive force detection unit, can be implemented by a computer including a CPU, a storage unit, and an interface, and programs which control the hardware resources. The CPU executes the above processes in accordance with the programs stored in the storage unit.

INDUSTRIAL APPLICABILITY

The present invention is applicable to flow rate measurement of fluid to be measured that flows through a measuring pipe.

The preceding description has been presented only to illustrate and describe exemplary embodiments of the present electromagnetic flowmeter. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An electromagnetic flowmeter comprising:
a measuring pipe through which fluid to be measured flows;
an electrode that is provided in the measuring pipe and detects an electromotive force generated by a magnetic field applied to the fluid and a flow of the fluid;
an exciting unit that applies, to the fluid, a time-changing magnetic field that is symmetrical with respect to an electrode plane that includes the electrode and is perpendicular to an axial direction of the measuring pipe;
a signal line that is connected to the electrode at one end thereof and provided so as to be inclined with respect to a direction of a magnetic field parallel to the electrode plane and such that an electromotive force is generated by a change in the magnetic field with passage of time;
a signal conversion unit that is connected to another end of the signal line and extracts a $\partial A/\partial t$ component that is unrelated to a flow speed of the fluid and results from a change in the magnetic field with passage of time, from a resultant electromotive force of: an electromotive force of the $\partial A/\partial t$ component; and an electromotive force of a v×B component that results from a flow speed of the fluid, the resultant electromotive force being detected by the electrode and the signal line; and
a flow rate output unit that eliminates, on the basis of the extracted $\partial A/\partial t$ component, a variation factor as to a span that is a coefficient applied to a magnitude V of a flow speed of the v×B component in the resultant electromotive force, and calculates a flow rate of the fluid on the basis of a result in which the variation factor is eliminated.

2. The electromagnetic flowmeter according to claim 1, wherein the signal line has a portion extending in the same direction as the axial direction of the measuring pipe.

3. The electromagnetic flowmeter according to claim 1 or 2, wherein
the exciting unit comprises: an exciting coil that is provided such that a coil axis is included in the electrode plane; and a power supply that supplies exciting current to the exciting coil, and
the signal conversion unit extracts the ∂A/∂t component by obtaining a phase difference or a time difference between the resultant electromotive force and the exciting current.

4. The electromagnetic flowmeter according to claim 3, wherein
the power supply supplies exciting current of a first frequency to the exciting coil,
the signal conversion unit extracts the ∂A/∂t component by obtaining a phase difference between the exciting current and a component of the first frequency out of the resultant electromotive force, and
the flow rate output unit eliminates, on the basis of the extracted ∂A/∂t component, a variation factor as to a span, which is included in a v×B component in the first frequency component of the resultant electromotive force, and calculates the flow rate of the fluid on the basis of a result in which the variation factor is eliminated.

5. The electromagnetic flowmeter according to claim 3, wherein
the electrode comprises a pair of electrodes that are provided on an axis perpendicular to an axis of the measuring pipe, so as to face each other through the axis of the measuring pipe, and
the signal line comprises two signal lines that are connected to the electrodes, respectively, at least one of the two signal lines being provided so as to be inclined with respect to a direction of a magnetic field parallel to the electrode plane and such that an electromotive force is generated by a change in the signal line with passage of time.

6. The electromagnetic flowmeter according to claim 3, further comprising an outer core that covers an outside of the exciting coil, wherein
the signal line is provided within the outer core so as to be inclined with respect to a direction of a magnetic field parallel to the electrode plane and such that an electromotive force is generated by a change in the magnetic field with passage of time.

7. The electromagnetic flowmeter according to claim 1 or 2, wherein
the exciting unit comprises: an exciting coil that is provided such that a coil axis is included in the electrode plane; and a power supply that supplies, to the exciting coil, exciting current that simultaneously or alternately provides a plurality of exciting frequencies, and
the signal conversion unit extracts the ∂A/∂t component by obtaining amplitudes and phases of simultaneously or alternately obtained at least two different frequency components out of the resultant electromotive force.

8. The electromagnetic flowmeter according to claim 7, wherein
the power supply supplies, to the exciting coil, exciting current that simultaneously or alternately provides two different exciting frequencies that are a first frequency and a second frequency,
the signal conversion unit obtains amplitudes and phases of two frequency components of the first and second frequencies out of the resultant electromotive force, and extracts an electromotive force difference between the two frequency components as the ∂A/∂t component on the basis of the amplitudes and the phases, and
the flow rate output unit eliminates, on the basis of the extracted ∂A/∂t component, a variation factor as to a span, which is included in a v×B component in the first or second frequency component out of the resultant electromotive force, and calculates the flow rate of the fluid on the basis of a result in which the variation factor is eliminated.

9. The electromagnetic flowmeter according to claim 1 or 2, wherein
the exciting unit comprises: an exciting coil that is provided such that a coil axis is included in the electrode plane; and a power supply that supplies exciting current to the exciting coil,
the signal line comprises a plurality of signal lines that are provided on paths different from each other, and
the signal conversion unit extracts the ∂A/∂t component by obtaining a sum of or a difference between resultant electromotive forces obtained from the plurality of signal lines.

10. The electromagnetic flowmeter according to claim 9, wherein
the electrode comprises a pair of electrodes that are provided on an axis perpendicular to an axis of the measuring pipe, so as to face each other through the axis of the measuring pipe,
the signal line comprises two signal lines that are connected to the electrodes, respectively, and provided so as to extend from the electrode plane in directions opposite to each other,
the signal conversion unit extracts the ∂A/∂t component by obtaining a sum of resultant electromotive forces obtained from the two signal lines, and
the flow rate output unit eliminates, on the basis of the extracted ∂A/∂t component, a variation factor as to a span, which is included in a v×B component in a difference between the resultant electromotive forces obtained from the two signal lines, and calculates the flow rate of the fluid on the basis of a result in which the variation factor is eliminated.

11. The electromagnetic flowmeter according to claim 9, wherein
the signal line comprises a plurality of signal lines that are connected to the same electrode, and
the signal conversion unit extracts the ∂A/∂t component by obtaining amplitudes and phases of resultant electromotive forces obtained from at least two signal lines, out of resultant electromotive forces obtained from the plurality of signal lines.

12. The electromagnetic flowmeter according to claim 11, wherein
- the signal line comprises first and second signal lines that are connected to the same electrode and provided so as to extend from the electrode plane in directions opposite to each other,
- the signal conversion unit obtains an amplitude and a phase of each of: a first resultant electromotive force obtained from the first signal line; and a second resultant electromotive force obtained from the second signal line, and extracts an electromotive force difference between the first and second resultant electromotive forces as the ∂A/∂t component on the basis of the amplitudes and the phases, and
- the flow rate output unit eliminates, on the basis of the extracted ∂A/∂t component, a variation factor as to a span, which is included in a v×B component in an electromotive force sum of the first and second resultant electromotive forces, and calculates the flow rate of the fluid on the basis of a result in which the variation factor is eliminated.

13. The electromagnetic flowmeter according to claim 11, wherein
- the electrode comprises a pair of electrodes that are provided on an axis perpendicular to an axis of the measuring pipe, so as to face each other through the axis of the measuring pipe, and
- out of signal lines connected to each electrode, at least signal lines connected to one of the electrodes are provided so as to be inclined with respect to a direction of a magnetic field parallel to the electrode plane and such that an electromotive force is generated by a change in the magnetic field with passage of time.

14. The electromagnetic flowmeter according to claim 1, further comprising an outer core that covers an outside of the exciting unit, wherein
- the signal line is provided within the outer core so as to be inclined with respect to a direction of a magnetic field parallel to the electrode plane and such that an electromotive force is generated by a change in the magnetic field with passage of time.

* * * * *